United States Patent
Kalamkar et al.

(10) Patent No.: US 12,255,847 B2
(45) Date of Patent: Mar. 18, 2025

(54) FLEXIBLE FEEDBACK WITH OUTER CODING

(71) Applicant: QUALCOMM Incorporated, San Diego, CA (US)

(72) Inventors: Sanket Sanjay Kalamkar, San Diego, CA (US); Ravi Agarwal, San Diego, CA (US); Yih-Hao Lin, San Diego, CA (US); Peerapol Tinnakornsrisuphap, San Diego, CA (US); Prashanth Haridas Hande, San Diego, CA (US); Mickael Mondet, Louannec (FR); Hyun Yong Lee, San Diego, CA (US); Chih-Ping Li, San Diego, CA (US); Amira Alloum, Boulogne Billancourt (FR)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 17/669,100

(22) Filed: Feb. 10, 2022

(65) Prior Publication Data

US 2023/0254092 A1 Aug. 10, 2023

(51) Int. Cl.
*H04L 5/00* (2006.01)
*H04L 1/00* (2006.01)
*H04L 1/06* (2006.01)
*H04L 1/1812* (2023.01)

(52) U.S. Cl.
CPC .......... *H04L 5/0055* (2013.01); *H04L 1/0073* (2013.01); *H04L 1/0687* (2013.01); *H04L 1/1812* (2013.01); *H04L 5/0048* (2013.01)

(58) Field of Classification Search
CPC ... H04L 1/0073; H04L 1/0687; H04L 1/1685; H04L 1/1812; H04L 5/0048; H04L 5/0055
USPC .......................................................... 370/329
See application file for complete search history.

(56) References Cited

U.S. PATENT DOCUMENTS

| | | | |
|---|---|---|---|
| 2004/0030790 A1 | 2/2004 | Le et al. | |
| 2008/0165697 A1 | 7/2008 | Zeira et al. | |
| 2018/0123767 A1* | 5/2018 | Islam | H04L 1/1816 |
| 2018/0302128 A1* | 10/2018 | Akkarakaran | H04B 7/0421 |
| 2019/0373607 A1* | 12/2019 | Zhang | H04L 5/0055 |
| 2020/0259599 A1* | 8/2020 | Zhang | H04L 1/1864 |
| 2022/0077972 A1* | 3/2022 | Rico Alvarino | H04L 1/008 |

(Continued)

FOREIGN PATENT DOCUMENTS

EP 2595424 A1 5/2013

OTHER PUBLICATIONS

International Search Report and Written Opinion—PCT/US2023/012071—ISA/EPO—May 22, 2023.

*Primary Examiner* — Robert J Lopata
(74) *Attorney, Agent, or Firm* — Holland & Hart LLP

(57) ABSTRACT

Methods, systems, and devices for wireless communications are described. A user equipment (UE) may receive multiple transport blocks (TBs) representing an application data unit (ADU) from a base station. The base station may transmit an indication that the UE is to provide ADU level feedback. The UE may determine the ADU level feedback based on whether the ADU is successfully received and decoded or not. The UE may indicate the ADU level feedback for the TBs to the base station. The base station and the UE may communicate according to the ADU level feedback.

30 Claims, 16 Drawing Sheets

(56) References Cited

U.S. PATENT DOCUMENTS

2022/0158776 A1* 5/2022 Kang .................... H04L 1/1685
2022/0361023 A1* 11/2022 Luo ....................... H04L 1/1864

* cited by examiner

FLEXIBLE FEEDBACK WITH OUTER CODING

FIELD OF TECHNOLOGY

The following relates to wireless communications, including flexible feedback with outer coding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support flexible feedback with outer coding. Generally, the described techniques provide for a user equipment (UE) to transmit feedback messages at an application data unit (ADU) level. For example, the UE may receive one or more transport blocks (TBs) in an ADU. The UE may also receive an indication (e.g., in control signaling) to perform feedback at the ADU level, such as by transmitting a positive acknowledgement (ACK) if the ADU is received and decoded successfully or not transmitting a feedback message if the ADU is received or decoded unsuccessfully. The control signaling may also include an interruption configuration that configures the UE to interrupt a decoding process of the ADU if a threshold number of TBs are decoded or received unsuccessfully. The UE may transmit a feedback message for the ADU according to the indication.

A method for wireless communications at a UE is described. The method may include receiving, from a base station, a set of multiple TBs representing an ADU, receiving an indication that the UE is to provide feedback at an ADU level, determining ADU level feedback for the set of multiple TBs, and indicating the ADU level feedback to the base station.

An apparatus for wireless communications at a UE is described. The apparatus may include a processor, memory coupled with the processor, and instructions stored in the memory. The instructions may be executable by the processor to cause the apparatus to receive, from a base station, a set of multiple TBs representing an ADU, receive an indication that the UE is to provide feedback at an ADU level, determine ADU level feedback for the set of multiple TBs, and indicate the ADU level feedback to the base station.

Another apparatus for wireless communications at a UE is described. The apparatus may include means for receiving, from a base station, a set of multiple TBs representing an ADU, means for receiving an indication that the UE is to provide feedback at an ADU level, means for determining ADU level feedback for the set of multiple TBs, and means for indicating the ADU level feedback to the base station.

A non-transitory computer-readable medium storing code for wireless communications at a UE is described. The code may include instructions executable by a processor to receive, from a base station, a set of multiple TBs representing an ADU, receive an indication that the UE is to provide feedback at an ADU level, determine ADU level feedback for the set of multiple TBs, and indicate the ADU level feedback to the base station.

In some examples of the method, apparatuses, and non-transitory computer-readable medium described herein, receiving the indication may include operations, features, means, or instructions for receiving an ADU level feedback configuration that provides that the UE may be to transmit a positive feedback message when the ADU may be decoded successfully and to refrain from transmitting a feedback message when the ADU may be decoded or received unsuccessfully.

In some examples of the method, apparatuses, and non-transitory computer-readable medium described herein, indicating the ADU level feedback to the base station may include operations, features, means, or instructions for transmitting, as the ADU level feedback, a positive feedback message indicating the ADU may be decoded successfully.

In some examples of the method, apparatuses, and non-transitory computer-readable medium described herein, indicating the ADU level feedback to the base station may include operations, features, means, or instructions for refraining from transmitting a feedback message for the ADU based on the ADU being decoded or received unsuccessfully, where an absence of feedback message transmission may be indicative of a negative feedback message.

In some examples of the method, apparatuses, and non-transitory computer-readable medium described herein, receiving the indication may include operations, features, means, or instructions for receiving an ADU level feedback configuration that provides that the UE may be to transmit an interruption feedback message before receipt of the ADU may be complete, the interruption feedback message configured to be transmitted when a threshold number of errors associated with the receipt or decoding of the ADU may be identified.

Some examples of the method, apparatuses, and non-transitory computer-readable medium described herein may further include operations, features, means, or instructions for determining a threshold number of errors associated with the receipt or decoding of the ADU and transmitting, before receipt of the ADU may be complete, an interruption feedback message as the ADU level feedback based on the threshold number of errors being satisfied for the ADU.

In some examples of the method, apparatuses, and non-transitory computer-readable medium described herein, receiving the plurality of TBs representing the ADU may include operations, features, means, or instructions for receiving the ADU via a stream of coded packets encoded using outer coding, the outer coding introducing redundancy in the stream of coded packets.

In some examples of the method, apparatuses, and non-transitory computer-readable medium described herein, the UE is to provide feedback at the ADU level based at least in part on the redundancy in the outer coding.

In some examples of the method, apparatuses, and non-transitory computer-readable medium described herein, receiving the indication may include operations, features, means, or instructions for receiving radio resource control (RRC) signaling configuring the UE to provide the ADU level feedback.

Some examples of the method, apparatuses, and non-transitory computer-readable medium described herein may further include operations, features, means, or instructions for receiving a control message that indicates whether the UE may be to provide hybrid automatic repeat request (HARQ) feedback, where the indication that the UE may be to provide feedback at the ADU level was received in accordance with the control message.

In some examples of the method, apparatuses, and non-transitory computer-readable medium described herein, the control message indicates whether the UE may be to provide HARQ feedback via a specific value of either a physical downlink shared channel (PDSCH)-to-HARQ feedback timing indicator or a HARQ process number and the control message includes downlink control information in a downlink control channel message.

In some examples of the method, apparatuses, and non-transitory computer-readable medium described herein, the indication may be received via a downlink control channel configured to indicate that the UE may be to provide one of TB level feedback or the ADU level feedback.

A method for wireless communications at a base station is described. The method may include transmitting, to a UE, a set of multiple TBs representing an ADU, transmitting an indication to the UE that the UE is to provide feedback at an ADU level, determining, based on a transmission from the UE or a lack of transmissions from the UE, ADU level feedback for the ADU, and communicating with the UE in accordance with the ADU level feedback.

An apparatus for wireless communications at a base station is described. The apparatus may include a processor, memory coupled with the processor, and instructions stored in the memory. The instructions may be executable by the processor to cause the apparatus to transmit, to a UE, a set of multiple TBs representing an ADU, transmit an indication to the UE that the UE is to provide feedback at an ADU level, determine, based on a transmission from the UE or a lack of transmissions from the UE, ADU level feedback for the ADU, and communicate with the UE in accordance with the ADU level feedback.

Another apparatus for wireless communications at a base station is described. The apparatus may include means for transmitting, to a UE, a set of multiple TBs representing an ADU, means for transmitting an indication to the UE that the UE is to provide feedback at an ADU level, means for determining, based on a transmission from the UE or a lack of transmissions from the UE, ADU level feedback for the ADU, and means for communicating with the UE in accordance with the ADU level feedback.

A non-transitory computer-readable medium storing code for wireless communications at a base station is described. The code may include instructions executable by a processor to transmit, to a UE, a set of multiple TBs representing an ADU, transmit an indication to the UE that the UE is to provide feedback at an ADU level, determine, based on a transmission from the UE or a lack of transmissions from the UE, ADU level feedback for the ADU, and communicate with the UE in accordance with the ADU level feedback.

In some examples of the method, apparatuses, and non-transitory computer-readable medium described herein, transmitting the indication may include operations, features, means, or instructions for transmitting an ADU level feedback configuration that provides that the UE may be to transmit a positive feedback message when the ADU may be decoded successfully and to refrain from transmitting a feedback message when the ADU may be decoded or received unsuccessfully.

In some examples of the method, apparatuses, and non-transitory computer-readable medium described herein, determining the ADU level feedback may include operations, features, means, or instructions for receiving, as the ADU level feedback, a positive feedback message from the UE indicating the ADU may be decoded successfully.

Some examples of the method, apparatuses, and non-transitory computer-readable medium described herein may further include operations, features, means, or instructions for refraining from transmitting one or more additional TBs associated with the ADU based on receiving the positive feedback message.

In some examples of the method, apparatuses, and non-transitory computer-readable medium described herein, transmitting the indication may include operations, features, means, or instructions for transmitting an ADU level feedback configuration that provides that the UE may be to transmit an interruption feedback message before receipt of the ADU may be complete, the interruption feedback message configured to be transmitted when a threshold number of errors associated with the receipt or decoding of the ADU may be identified.

Some examples of the method, apparatuses, and non-transitory computer-readable medium described herein may further include operations, features, means, or instructions for receiving, before transmission of the ADU may be complete, an interruption feedback message as the ADU level feedback based on a threshold number of errors being satisfied for the ADU.

In some examples of the method, apparatuses, and non-transitory computer-readable medium described herein, receiving the plurality of TBs representing the ADU may include operations, features, means, or instructions for receiving the ADU via a stream of coded packets encoded using outer coding, the outer coding introducing redundancy in the stream of coded packets.

In some examples of the method, apparatuses, and non-transitory computer-readable medium described herein, the UE is to provide feedback at the ADU level based at least in part on the redundancy in the outer coding.

In some examples of the method, apparatuses, and non-transitory computer-readable medium described herein, transmitting the indication may include operations, features, means, or instructions for transmitting RRC signaling configuring the UE to provide the ADU level feedback.

Some examples of the method, apparatuses, and non-transitory computer-readable medium described herein may further include operations, features, means, or instructions for transmitting a control message that indicates whether the UE may be to provide HARQ feedback, where the indication that the UE may be to provide feedback at the ADU level was transmitted in accordance with the control message.

In some examples of the method, apparatuses, and non-transitory computer-readable medium described herein, the control message indicates whether the UE may be to provide HARQ feedback via a specific value of either an PDSCH-to-HARQ feedback timing indicator or a HARQ process number and the control message includes downlink control information in a downlink control channel message.

Some examples of the method, apparatuses, and non-transitory computer-readable medium described herein may further include operations, features, means, or instructions for determining that the UE may be to provide feedback based on a content of the set of multiple TBs representing the ADU and transmitting the indication based on the set of multiple TBs including a RRC message, a non-access stratum message, one or more data radio bearers, or a combination thereof.

In some examples of the method, apparatuses, and non-transitory computer-readable medium described herein, the indication may be transmitted via a downlink control channel configured to indicate that the UE may be to provide one of TB level feedback or the ADU level feedback.

DETAILED DESCRIPTION

Figure 1:
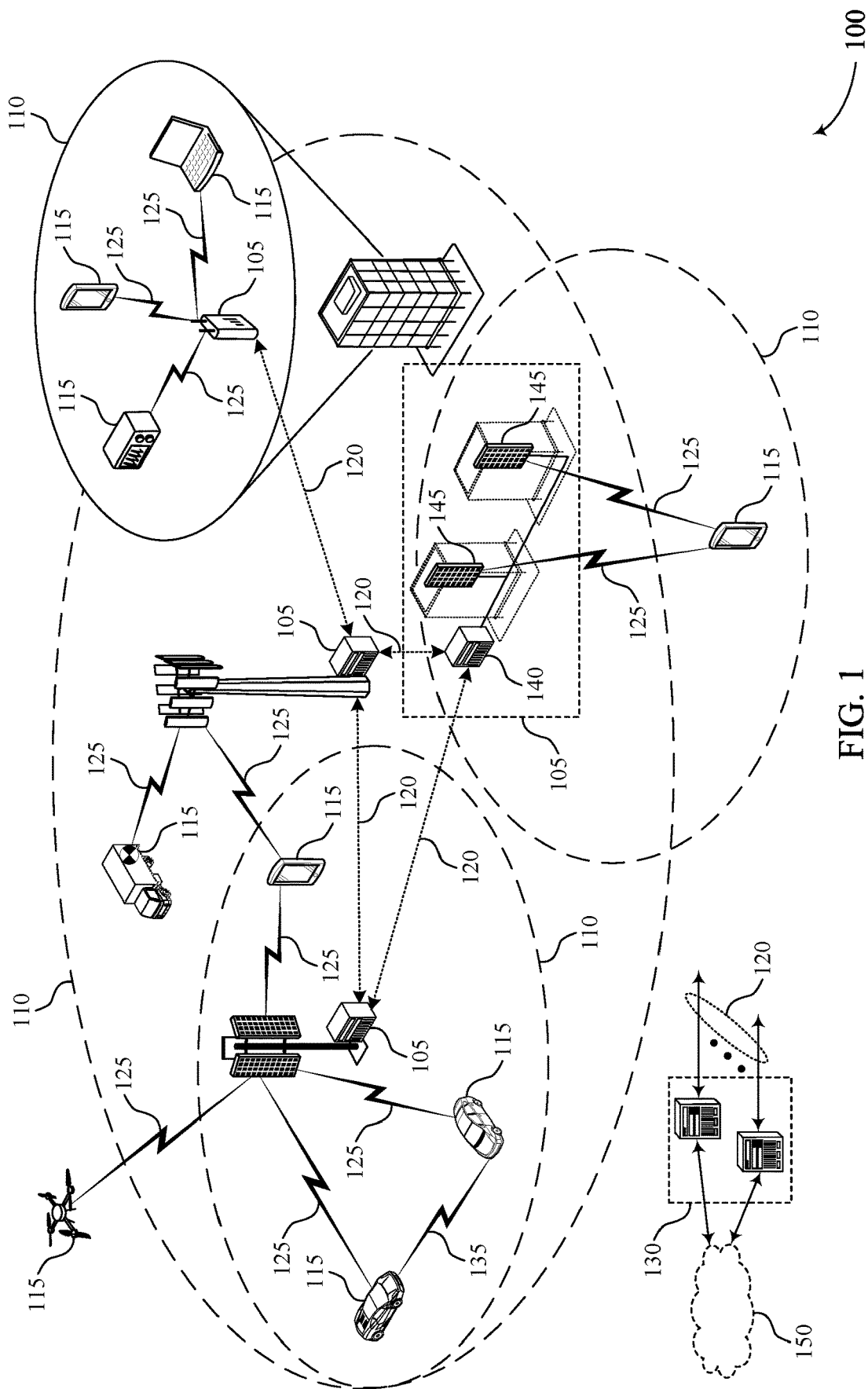
FIGS. 1 and 2 illustrate examples of wireless communications systems that support flexible feedback with outer coding in accordance with aspects of the present disclosure.

In some wireless communications systems, wireless devices may exchange data over a channel using transport blocks (TBs). A wireless device may transmit a feedback message in response to the TBs. That is, feedback may be applied on a TB-based level. In some examples, such as in extended reality (XR) systems, communication traffic may be organized in application data units (ADUs). For example, a wireless device may receive a minimum granularity of application data prior to processing a level of an application. The minimum granularity of application data may be referred to as an ADU. In some instances, each ADU may be divided into a number of sub-packets, where each packet may be further divided into a number of TBs. In some examples, the TBs may be organized into code block groups (CBGs). The wireless device may provide feedback for a transmission according to a granularity, such as at an ADU-level, a TB-level, a CBG-level, or the like. There may be some redundancy in the sub-packets. However, when the redundancy is applied in the form of outer coding, a user equipment (UE) may have flexibility in when or what type of feedback should be provided.

As described herein, UEs may be configured to provide ADU-level feedback for a transmission. For example, a UE may receive a transmission including TBs in one or more packets representing an ADU. The UE may also receive an indication to provide feedback at an ADU level, such as via control signaling (e.g., radio resource control (RRC) signaling, a downlink control information (DCI) message, or the like). If the UE successfully receives and decodes a threshold number of TBs in the ADU, the UE may transmit a positive feedback message, or acknowledgement (ACK). If the UE unsuccessfully receives or decodes the ADU, the UE may not transmit a feedback message. The lack of a feedback transmission may indicate to the base station that the ADU had not been successfully decoded. Additionally or alternatively, if the UE unsuccessfully receives or decodes a threshold number of TBs of the ADU, the UE may transmit an interruption message in the middle of the ADU. Thus, the base station may receive an ACK, an interruption message, or nothing at all, and may thus discern whether the ADU transmission was successful. If the base station receives an ACK, the base station may flush out remaining TBs belonging to the same ADU. If the base station does not receive an ACK, the base station may continue to retransmit TBs for the ADU. If the base station receives an interrupt message, the base station may stop transmitting the TBs of the current ADU and skip to a retransmission of the ADU.

Aspects of the disclosure are initially described in the context of wireless communications systems. Aspects of the disclosure are further described in the context of resource diagrams and process flows. Aspects of the disclosure are further illustrated by and described with reference to apparatus diagrams, system diagrams, and flowcharts that relate to flexible feedback with outer coding.

FIG. 1 illustrates an example of a wireless communications system 100 that supports flexible feedback with outer coding in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. For example, the UE 115 may be augmented reality (AR) glasses, head mounted devices (HMDs), and the like.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

To apply outer coding to an ADU, a base station 105 may divide an ADU into a number of subpackets and may add a percentage redundancy to the subpackets. Once a UE 115 correctly receives a threshold number of subpackets of an ADU, the UE 115 may successfully decode the ADU. Thus, an outer coding scheme provides for the UE 115 to begin decoding the ADU earlier. However, when the redundancy is applied in the form of outer coding, the UE 115 may have flexibility in when or what type of feedback should be provided for a data transmission.

In some examples, a base station 105 may configure a UE 115 to perform feedback at an ADU level for a data transmission. For example, the base station 105 may transmit control signaling that configures a feedback transmission from a UE 115. The feedback indication may indicate whether the UE 115 is to transmit feedback for a downlink transmission. The feedback may be HARQ feedback, such as an ACK if an ADU transmission is received and decoded successfully. Additionally or alternatively, the UE 115 may refrain from transmitting a feedback message when the ADU is received or decoded successfully.

Figure 2:
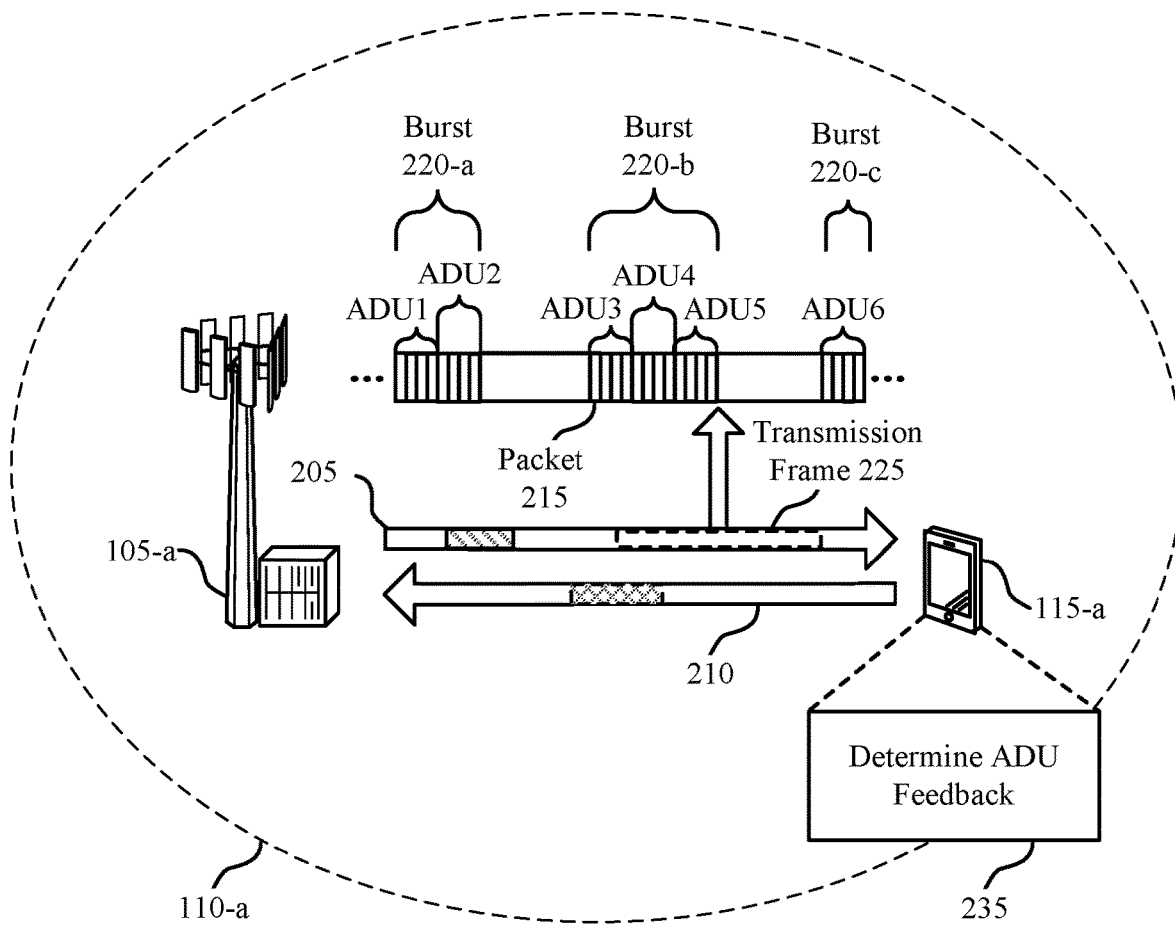

FIG. 2 illustrates an example of a wireless communications system 200 that supports flexible feedback with outer coding in accordance with aspects of the present disclosure. In some examples, wireless communications system 200 may implement aspects of wireless communications system 100 and may include a UE 115-*a* and a base station 105-*a* with a coverage area 110-*a*, which may be examples of a UE 115 and a base station 105 with a coverage area 110 as described with reference to FIG. 1. In some examples, base station 105-*a* and UE 115-*a* may communicate control information, data, or both using a downlink communication link 205. Similarly, UE 115-*a* may communicate control information, data, or both with base station 105-*a* using an uplink communication link 210. For example, base station 105-*a* may transmit one or more ADUs to UE 115-*a* via the downlink communication link 205, and UE 115-*a* may transmit a feedback message in response via uplink communication link 210.

In some examples, wireless communications system 200 may be an example of an XR system. In the XR system, UE 115-*a* may operate according to reduced power consumption capabilities. For example, UE 115-*a* may be AR glasses for cloud gaming (CG) with a reduced battery life when compared with other wireless devices (e.g., a cell phone). Further, UE 115-*a* may be tethered with another wireless device, which may cause increased power consumption.

In some cases, UE 115-*a* and base station 105-*a* may exchange information in the form of data transmissions via the downlink communication link 205, such as encoded video and scene information for CG. The data transmissions may arrive at UE 115-*a* periodically. For example, base station 105-*a* may transmit one or more ADUs, such as ADU1 through ADU6, to UE 115-*a* in a transmission frame 225. An ADU may include one or more IP packets, which may be referred to as packets 215. For example, ADU1 through ADU6 may each include four packets 215. Each packet 215 may include one or more TBs, which may also be grouped into CBGs. To process an ADU, each packet 215 in the ADU may be received at UE 115-*a*. On the other hand, a burst is a set of ADUs generated at roughly the same time. UE 115-*a* may wait for a threshold granularity (e.g., minimum granularity) of application data to be available prior to processing the data. The application data may be packetized into packets 215, thus UE 115-*a* may wait for a threshold number of packets 215 to be available prior to processing the application data. For example, UE 115-*a* may begin processing application data if a percentage of bits or all bits of a transmission frame 225, which may be a video frame, are available. The threshold granularity may be referred to as an ADU.

Downlink traffic (e.g., for XR and CG) to UE 115-*a* may include bursts of traffic that carry one or more ADUs. In some cases, a data transmission, or transmission frame 225, may include multiple bursts 220 of ADUs, each burst 220 including one or more ADUs. For example, burst 220-*a* may include ADU1 and ADU2, burst 220-*b* may include ADU3, ADU4, and ADU5, while burst 220-*c* may include ADU6. Each ADU may carry one or more packets 215 with data, control information, or both. However, the ADU transmissions may include one or more communication errors (e.g., packet errors) that prevent UE 115-*a* from decoding or receiving the transmissions successfully. Thus, a base station 105 may include outer coding to add redundancy to a transmission and reduce the impact of errors. Outer code may refer to a set of block codes with relatively longer codewords (e.g., Raptor codes).

To apply outer coding to an ADU, a base station 105 may divide an ADU into a number of subpackets (e.g., k subpackets). The subpackets may be packets 215, or any other size data unit (e.g., one packet 215, multiple packets 215, a transport block (TB), a codeblock (CB), multiple CBs, or the like). The base station 105 may determine to add a percentage redundancy to a transmission (e.g., y percent). An encoder at the base station 105 may convert k subpackets into $n=k\times(1+y)$ coded packets, where the encoding may be done by performing random combination (e.g., an XOR operation) over the original subpackets. Once a UE 115 correctly receives a threshold number of subpackets of an ADU (e.g., approximately k out of n subpackets), the UE 115 may successfully decode the ADU. Thus, an outer coding scheme provides for the UE 115 to begin decoding the ADU earlier. However, when the redundancy is applied in the form of outer coding, the UE 115 may have flexibility in when or what type of feedback should be provided for a data transmission.

In some examples, a base station 105 may configure a UE 115 to perform feedback at an ADU level for a data transmission. For example, base station 105-*a* may transmit control signaling (e.g., RRC signaling) that configures a feedback transmission from a UE 115. Base station 105-*a* may configure a downlink control information (DCI) message to include a feedback indication 230. Base station 105-*a* may transmit the feedback indication 230 to UE 115-*a* via the downlink communication link 205. The feedback indication 230 may indicate whether UE 115-*a* is to transmit feedback for a downlink transmission. The feedback may be HARQ feedback, such as an ACK if a transmission of an ADU is received and decoded successfully. Additionally or alternatively, UE 115-*a* may refrain from transmitting a feedback message if the ADU is decoded or received unsuccessfully.

In some examples, base station 105-*a* may configure UE 115-*a* to transmit feedback based on a level of importance of information in the transmission, which may also be referred to as a priority of the transmission (e.g., if a medium access control (MAC) packet data unit (PDU) includes relatively high priority information). For example, base station 105-*a* may configure feedback for a MAC-control element (MAC-CE), data from another data radio bearer (DRB), an RRC or non-access stratum (NAS) message, or the like. Base station 105-*a* may request feedback from UE 115-*a* over an uplink control channel (e.g., a physical uplink control channel (PUCCH)) to determine whether UE 115-*a* received a downlink control channel (e.g., a physical downlink control channel (PDCCH)) successfully. Base station 105-*a* may use a field in a DCI message for the feedback indication 230. For example, base station 105-*a* may transmit the feedback indication 230 in a physical downlink control channel (PDSCH)-to-HARQ feedback timing indicator or HARQ process number.

In some examples, the feedback indication 230 may request for UE 115-*a* to provide TB level feedback, ADU level feedback, or both. For example, UE 115-*a* may receive a PDCCH including the feedback indication 230. UE 115-*a* may transmit a feedback message to base station 105-*a* in uplink control information (UCI) according to the feedback indication 230. In some cases, at 235, UE 115-*a* may determine ADU level feedback for one or more packets 215. That is, UE 115-*a* may receive one or more ADUs in a burst 220, and may determine to transmit an ADU level feedback message 240 for each ADU according to the feedback indication 230, which is described in further detail with respect to FIG. 3. Base station 105-*a* may transmit the one or more packets 215 with outer coding, request an ADU level feedback message 240, and may monitor for feedback from UE 115-*a* accordingly.

In some examples, the lack of HARQ retransmissions due to UE 115-*a* not providing TB level feedback may be compensated by the added redundancy for outer coding. UE 115-*a* transmitting the ADU level feedback message 240 may provide for UE 115-*a* to improve power consumption by not sending uplink transmissions frequently (e.g., for each uplink slot). Additionally or alternatively, UE 115-*a* may enter a sleep mode (e.g., a lower power mode) earlier by transmitting one or more ADU level feedback messages 240 for the ADU.

In some cases, UE 115-*a* may provide a positive feedback message for the ADU level feedback message 240, such as an ACK, if an ADU is received and decoded successfully.

For example, UE 115-*a* may successfully receive and decode ADU1 from base station 105-*a*. The feedback indication 230 may request ADU level feedback from UE 115-*a*. UE 115-*a* may transmit an ACK to base station 105-*a* in the ADU level feedback message 240 based on receiving and decoding ADU1 successfully and based on the feedback indication 230 requesting ADU level feedback. UE 115-*a* may provide the ACK in UCI.

In some other cases, UE 115-*a* may provide a negative feedback message, such as a NACK, by not transmitting UCI including the ADU level feedback message 240. If base station 105-*a* receives the ADU level feedback message 240 in error, base station 105-*a* may know that UE 115-*a* has successfully decoded the ADU, because UE 115-*a* may not transmit the ADU level feedback message 240 when UE 115-*a* unsuccessfully decodes or receives the ADU. If base station 105-*a* misses the ADU level feedback message 240, base station 105-*a* may continue transmitting one or more coded packets 215 (e.g., the rest of the one or more packets 215 in a transmission). Base station 105-*a* and UE 115-*a* may both enable the configurable feedback indication. For example, base station 105-*a* may configure UE 115-*a* to enable the ADU level feedback message 240 for transmitting an ACK and no ADU level feedback message 240 if a transmission is received unsuccessfully. Base station 105-*a* may configure UE 115-*a* via control signaling, such as via RRC signaling, a DCI message, a MAC-CE, or the like.

If an error occurs in a burst within the ADU, the remaining packets may be decoded unsuccessfully (e.g., the ADU may have an incorrect MCS, channel blocking may prevent proper transmission, or the like). The burst carrying error information may be different from the traffic burst 220. In some examples, UE 115-*a* may send an interruption message as the ADU level feedback message 240. For example, UE 115-*a* may determine a number of transmission errors happen within an ADU (e.g., a threshold number of packets are received or decoded unsuccessfully). In some cases, UE 115-*a* may transmit the interruption message in the middle of the ADU. UE 115-*a* may transmit the interruption message to base station 105-*a* over an uplink control channel (e.g., a PUCCH) as the ADU level feedback message 240 based on the errors being above the threshold. If the number of errors stays below the threshold value, UE 115-*a* may not transmit the interruption message. UE 115-*a* may transmit the interruption message per ADU (e.g., at an ADU-level), such that there may be one feedback message per ADU transmission. Base station 105-*a* may configure UE 115-*a* to transmit the interruption message according to the threshold number of errors via control signaling (e.g., RRC signaling).

In some examples, base station 105-*a* may flush out remaining coded packets 215 for an ADU based on receiving an ADU level feedback message 240 for the ADU. Flushing out remaining packets 215 may improve capacity for additional transmissions from base station 105-*a*. If base station 105-*a* misses the ADU level feedback message 240, base station 105-*a* may continue transmitting the coded packets 215.

Figure 3:
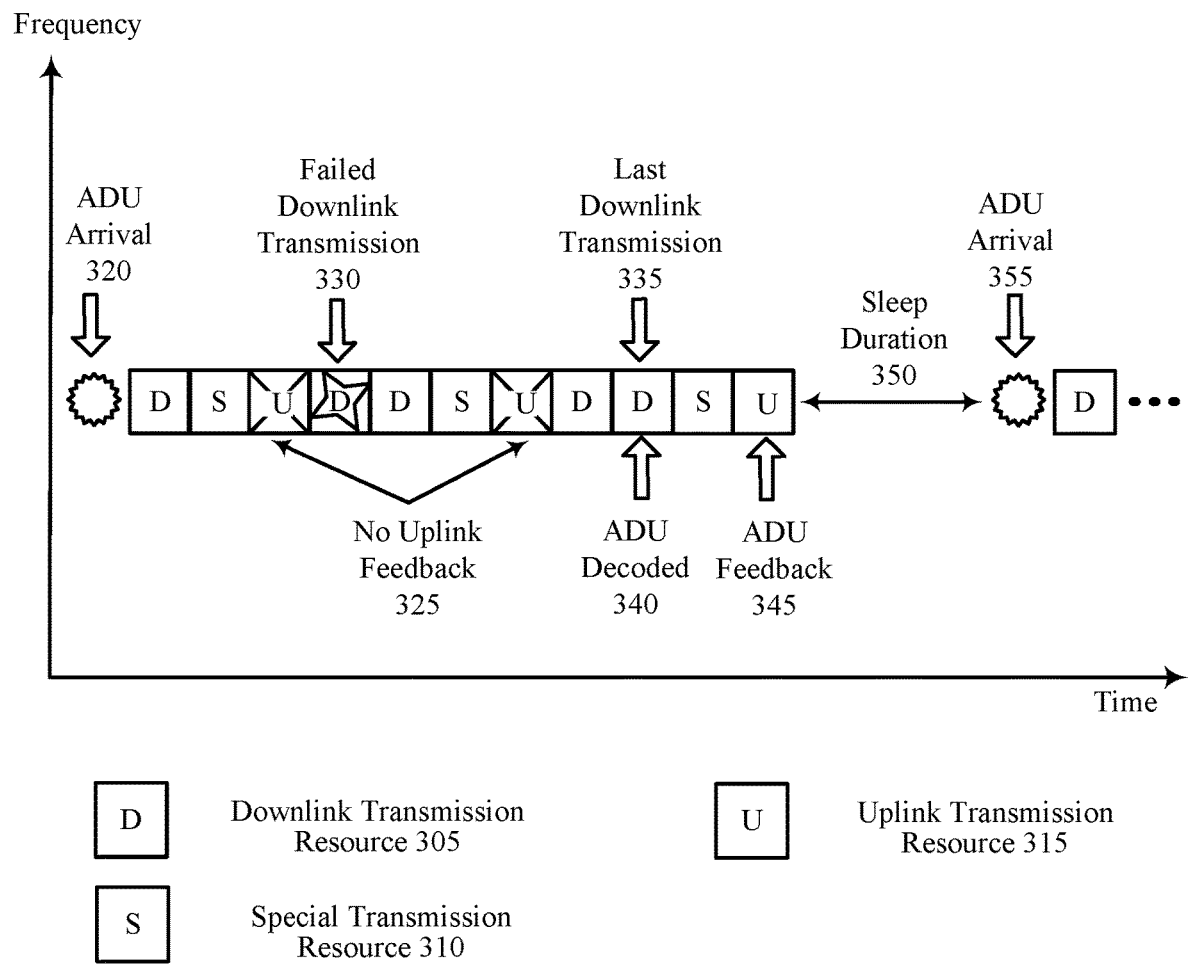
FIG. 3 illustrates an example of a resource diagram that supports flexible feedback with outer coding in accordance with aspects of the present disclosure.

FIG. 3 illustrates an example of a resource diagram 300 that supports flexible feedback with outer coding in accordance with aspects of the present disclosure. In some examples, resource diagram 300 may implement aspects of wireless communications system 100 and wireless communications system 200. For example, as illustrated in resource diagram 300, a base station 105 may configure a UE 115 to transmit ADU level feedback for a transmission.

In some examples, a base station 105 may transmit one or more ADUs in a burst to a UE 115. For example, a base station 105 may transmit a downlink transmission according to a slot format. A slot may be a duration for a part, or all, of a transmission. The slot may be divided into one or more symbols. Thus, a transmission may be across multiple symbols in a slot. Each symbol may be allocated according to the slot format as a downlink transmission resource 305, a special transmission resource 310, or an uplink transmission resource 315. A special transmission resource may include uplink resources and downlink resources, which may be divided by a guard band (e.g., to account for the time to switch from the downlink direction to the uplink direction for a transmission). The base station 105 may transmit the downlink transmission to a UE 115 during one or more downlink transmission resources 305 (e.g., during a symbol and using a frequency). Similarly, the base station 105 may receive an uplink transmission from the UE 115 during one or more uplink transmission resources 315. During a special transmission resource 310, a base station 105 may transmit or receive packets of data or control information.

A base station 105 may configure a UE 115 to transmit ADU level feedback (e.g., via control signaling). For example, the base station 105 may send RRC signaling indicating whether a DCI message may include an indication of whether the UE 115 is to transmit feedback (e.g., HARQ feedback). The UE 115 may receive the DCI message in a downlink control channel (e.g., a PDCCH) that indicates for the UE 115 to transmit TB level feedback (e.g., MAC-TB level feedback), ADU level feedback, or both. At 320, a UE 115 may receive an ADU, and may determine to transmit an ADU level feedback message for each ADU according to the feedback indication. The ADU may span several symbols, such as downlink transmission resources 305, special transmission resource 310, and uplink transmission resources 315. In some examples, the UE 115 may receive TBs of the ADU during the downlink transmission resources 305. At 325, the UE 115 may refrain from transmitting uplink feedback during the uplink transmission resources 315, regardless of a failed downlink transmission at 330.

At 335, the UE 115 may receive a last set of TBs for the ADU in a last downlink transmission resource 305. Concurrently, the UE 115 may determine the ADU is decoded successfully or unsuccessfully. At 345, during a last uplink transmission resource 315 (e.g., of a slot), the UE 115 may transmit an ADU level feedback message for the ADU that arrived at 320. In some examples, the ADU level feedback may include an ACK if the ADU is decoded successfully. The UE 115 may transmit the ACK in UCI on the uplink transmission resource 315. Once the base station 105 receives the ACK, the base station 105 may flush out any remaining TBs, or coded packets, for the ADU. In some other examples, the UE 115 may not transmit an ADU level feedback message based on unsuccessfully receiving or decoding the ADU. In some cases, the UE 115 may transmit an interrupt message as the ADU level feedback prior to the last uplink transmission resource 315 (e.g., at one of the uplink transmission resources 315 at 325) based on a threshold number of errors being met. The base station 105 may indicate the threshold number of errors in the control signaling (e.g., DCI message) to the UE 115. The UE 115 may transmit the interrupt message in the middle of the ADU transmission (e.g., prior to the last downlink transmission at 335).

In some examples, the UE 115 may enter a sleep duration 350 after transmitting the ADU feedback or refraining from transmitting the ADU feedback. The sleep duration may be configured at the UE 115 (e.g., in control signaling from the base station). At 355, after the sleep duration 350, the UE 115 may receive an additional ADU. The additional ADU may include a new transmission including new TBs or a retransmission of one or more TBs from the previous ADU based on the feedback for the previous ADU. For example, if the base station 105 receives an ACK at 345, the base station 105 may transmit new data in the ADU that arrives at 355. If the base station 105 fails to receive an ACK (e.g., the UE 115 refrains from transmitting a feedback message based on unsuccessfully decoding the ADU), the base station 105 may retransmit the data from the previous ADU in the ADU that arrives at 355.

Figure 4:
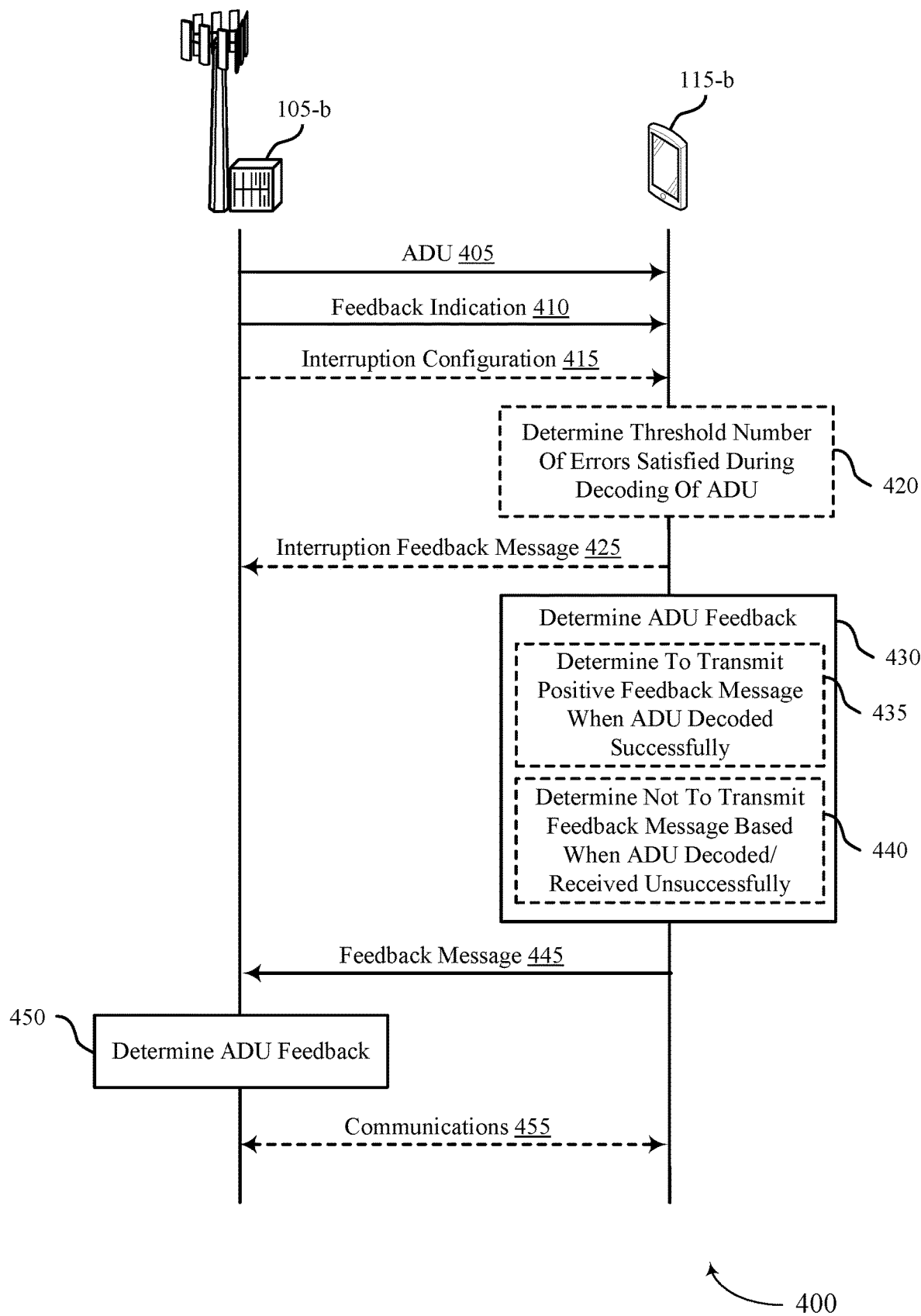
FIG. 4 illustrates an example of a process flow that supports flexible feedback with outer coding in accordance with aspects of the present disclosure.

FIG. 4 illustrates an example of a process flow 400 that supports flexible feedback with outer coding in accordance with aspects of the present disclosure. In some examples, the process flow 400 may implement aspects of wireless communications system 100, wireless communications system 200, and resource diagram 300. The process flow 400 may illustrate an example of a base station 105-b configuring a UE 115-b to transmit ADU level feedback for a transmission. Base station 105-b and UE 115-b may be examples of a base station 105 and a UE 115 as described with reference to FIGS. 1 and 2. Alternative examples of the following may be implemented, where some processes are performed in a different order than described or are not performed. In some cases, processes may include additional features not mentioned below, or further processes may be added.

At 405, UE 115-b may receive multiple TBs representing an ADU from base station 105-b. The TBs may also be referred to as packets, or may be any size of data transmission.

In some examples, base station 105-b may determine that UE 115-b is to provide feedback based on the content of the TBs representing an ADU. For example, if the TBs include important information (e.g., high priority information), such as a MAC-CE, data from another DRB, RRC messages, NAS messages, or the like, base station 105-b may determine UE 115-b is to provide feedback.

At 410, UE 115-b may receive an indication that UE 115-b is to provide feedback at an ADU level from base station 105-b. In some examples, UE 115-b may receive an ADU level feedback configuration that provides that UE 115-b is to transmit a positive feedback message (e.g., an ACK) when the ADU is decoded successfully and to refrain from transmitting a feedback message when the ADU is decoded or received unsuccessfully. In some cases, base station 105-b may transmit the indication in RRC signaling configuring UE 115-b to provide the ADU level feedback. In some other cases, base station 105-b may transmit a control message that indicates whether the UE is to provide HARQ feedback, where the indication that UE 115-b is to provide ADU level feedback is received in accordance with the control message. The control message may indicate whether UE 115-b is to provide HARQ feedback via a specific value of either a PDSCH-to-HARQ feedback timing indicator or a HARQ process number. The control message may include DCI in a PDCCH. In some examples, base station 105-b may transmit the feedback indication via a downlink control channel (e.g., PDCCH) configured by RRC signaling to indicate that UE 115-b is to provide TB level feedback, ADU level feedback, or both.

At 415, UE 115-b may receive an interruption configuration from base station 105-b. Base station 105-b may include the interruption configuration in the feedback indication, or in a separate indication. The interruption configuration may be an ADU level feedback configuration that provides that UE 115-b is to transmit an interruption feedback message before receipt of the ADU is complete (e.g., in the middle of the ADU transmission).

At 420, UE 115-b may determine a threshold number of errors is satisfied during decoding of the ADU. In some examples, the interruption configuration may include an indication of the threshold number of errors. For example, UE 115-b may determine the threshold number of errors for receipt or decoding of the ADU according to signaling from base station 105-b or independent of base station 105-b (e.g., the threshold may be defined at UE 115-b).

At 425, UE 115-b may transmit the interruption feedback message when the threshold number of errors for the receipt or decoding of the ADU are identified. UE 115-b may transmit the interruption feedback message before receipt of the ADU is complete based on the threshold number of errors being satisfied for the ADU.

At 430, UE 115-b may determine ADU level feedback for the TBs in the ADU. In some examples, at 435, UE 115-b may determine to transmit a positive feedback message (e.g., an ACK) to base station 105-b that indicates the ADU is decoded successfully.

In some other examples, at 440, UE 115-b may determine not to transmit a feedback message for the ADU based on the ADU being decoded or received unsuccessfully, where the absence of the feedback message is indicative of a negative feedback message (e.g., a NACK).

At 445, UE 115-b may indicate the ADU level feedback to base station 105-b for the ADU. In some examples, UE 115-b may transmit the positive feedback message (e.g., an ACK) to base station 105-b that indicates the ADU is decoded successfully. In some other examples, UE 115-b may refrain from transmitting a feedback message for the ADU based on the ADU being decoded or received unsuccessfully, where the absence of the feedback message is indicative of a negative feedback message (e.g., a NACK).

At 450, base station 105-b may determine ADU level feedback for the ADU based on an ACK or lack of an ACK.

At 455, UE 115-b and base station 105-b may communicate based on the ADU level feedback. For example, base station 105-b may refrain from transmitting one or more additional TBs of the ADU based on receiving an ACK. Similarly, base station 105-b may retransmit the ADU if base station 105-b fails to receive an ACK. In some cases, since the feedback by UE 115-b may be provided for an entire ADU, base station 105-b may not know which TBs were lost. If a retransmission is required, base station 105-b may retransmit an entire ADU.

Figure 5:
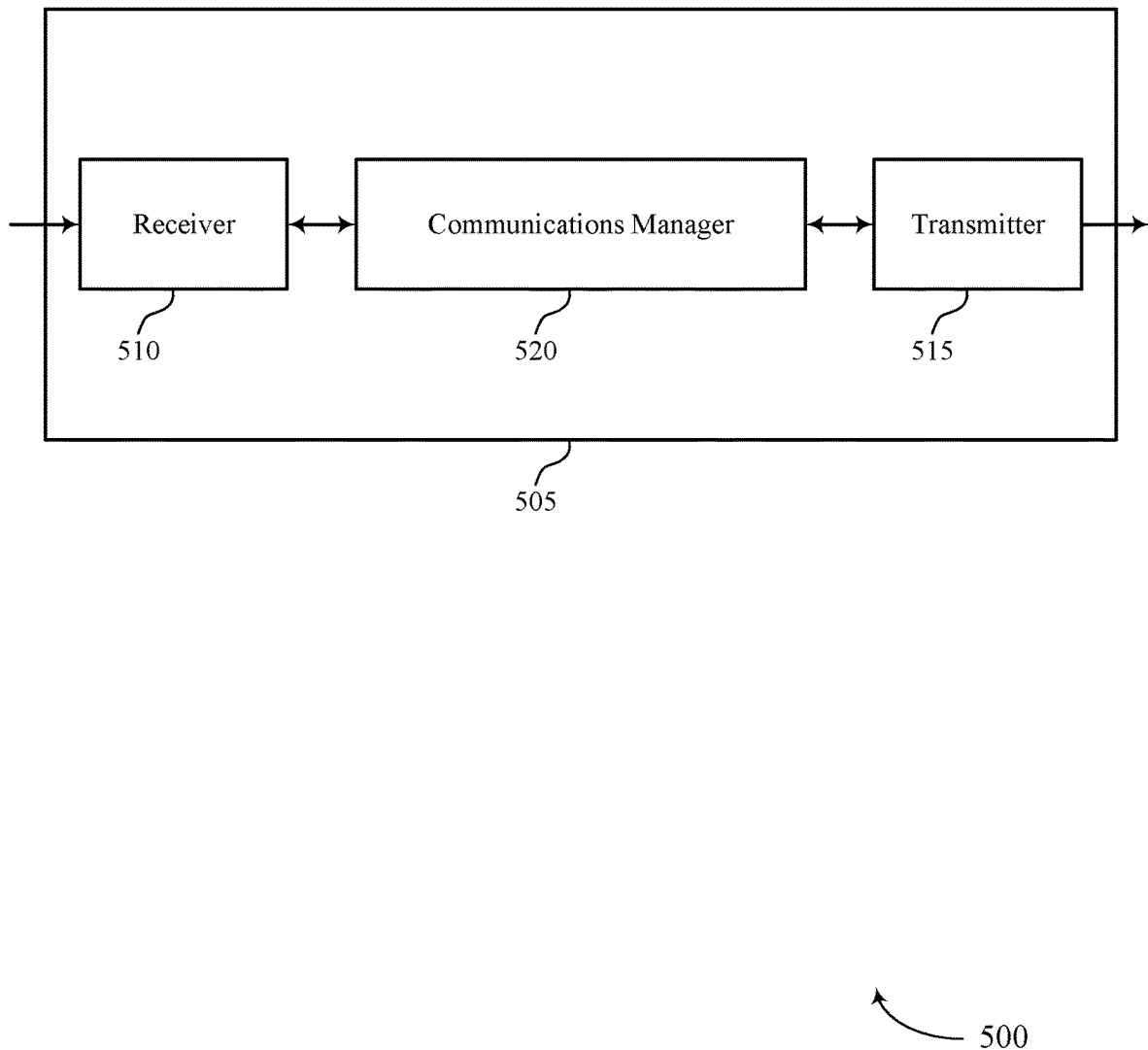
FIGS. 5 and 6 show block diagrams of devices that support flexible feedback with outer coding in accordance with aspects of the present disclosure.

FIG. 5 shows a block diagram 500 of a device 505 that supports flexible feedback with outer coding in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to flexible feedback with outer coding). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to flexible feedback with outer coding). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of flexible feedback with outer coding as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, a set of multiple transport blocks representing an ADU. The communications manager 520 may be configured as or otherwise support a means for receiving an indication that the UE is to provide feedback at an ADU level. The communications manager 520 may be configured as or otherwise support a means for determining ADU level feedback for the set of multiple transport blocks. The communications manager 520 may be configured as or otherwise support a means for indicating the ADU level feedback to the base station.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for a base station 105 to configure a UE 115 to transmit ADU level feedback for a transmission, which may provide for reduced processing, reduced power consumption, more efficient utilization of communication resources, or the like.

Figure 6:
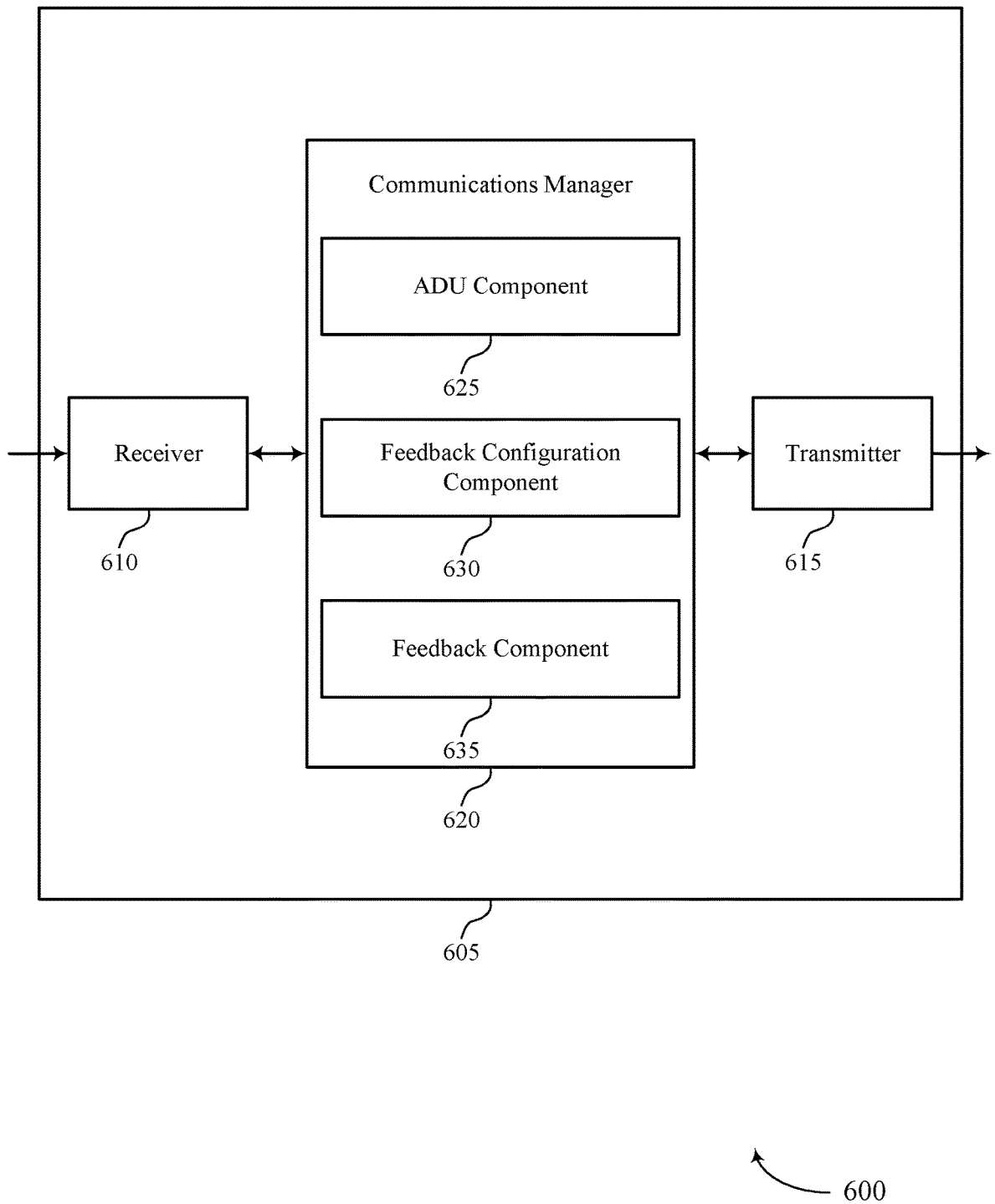

FIG. 6 shows a block diagram 600 of a device 605 that supports flexible feedback with outer coding in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to flexible feedback with outer coding). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to flexible feedback with outer coding). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of flexible feedback with outer coding as described herein. For example, the communications manager 620 may include an ADU component 625, a feedback configuration component 630, a feedback component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The ADU component 625 may be configured as or otherwise support a means for receiving, from a base station, a set of multiple transport blocks representing an ADU. The feedback configuration component 630 may be configured as or otherwise support a means for receiving an indication that the UE is to provide feedback at an ADU level. The feedback component 635 may be configured as or otherwise support a means for determining ADU level feedback for the set of multiple transport blocks. The feedback component 635 may be configured as or otherwise support a means for indicating the ADU level feedback to the base station.

Figure 7:
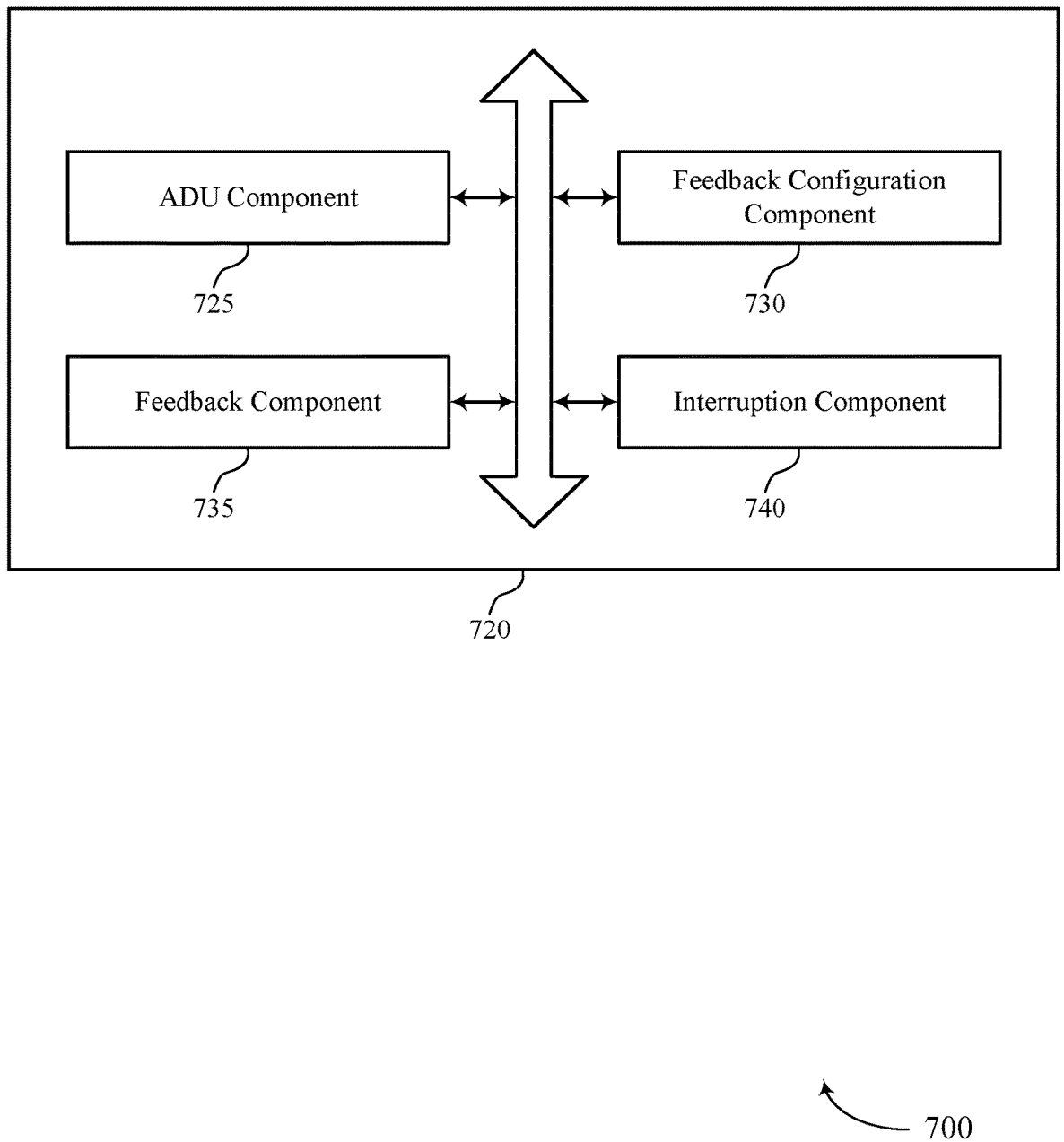
FIG. 7 shows a block diagram of a communications manager that supports flexible feedback with outer coding in accordance with aspects of the present disclosure.

FIG. 7 shows a block diagram 700 of a communications manager 720 that supports flexible feedback with outer coding in accordance with aspects of the present disclosure. The communications manager 720 may be an example of aspects of a communications manager 520, a communications manager 620, or both, as described herein. The communications manager 720, or various components thereof, may be an example of means for performing various aspects of flexible feedback with outer coding as described herein. For example, the communications manager 720 may include an ADU component 725, a feedback configuration component 730, a feedback component 735, an interruption component 740, or any combination thereof. Each of these components may communicate, directly or indirectly, with one another (e.g., via one or more buses).

The communications manager 720 may support wireless communications at a UE in accordance with examples as disclosed herein. The ADU component 725 may be configured as or otherwise support a means for receiving, from a base station, a set of multiple transport blocks representing an ADU. The feedback configuration component 730 may be configured as or otherwise support a means for receiving an indication that the UE is to provide feedback at an ADU level. The feedback component 735 may be configured as or otherwise support a means for determining ADU level feedback for the set of multiple transport blocks. In some examples, the feedback component 735 may be configured as or otherwise support a means for indicating the ADU level feedback to the base station.

In some examples, to support receiving the indication, the feedback configuration component 730 may be configured as or otherwise support a means for receiving an ADU level feedback configuration that provides that the UE is to transmit a positive feedback message when the ADU is decoded successfully and to refrain from transmitting a feedback message when the ADU is decoded or received unsuccessfully.

In some examples, to support indicating the ADU level feedback to the base station, the feedback component 735 may be configured as or otherwise support a means for transmitting, as the ADU level feedback, a positive feedback message indicating the ADU is decoded successfully.

In some examples, to support indicating the ADU level feedback to the base station, the feedback component 735 may be configured as or otherwise support a means for refraining from transmitting a feedback message for the ADU based on the ADU being decoded or received unsuccessfully, where an absence of feedback message transmission is indicative of a negative feedback message.

In some examples, to support receiving the indication, the feedback configuration component 730 may be configured as or otherwise support a means for receiving an ADU level feedback configuration that provides that the UE is to transmit an interruption feedback message before receipt of the ADU is complete, the interruption feedback message configured to be transmitted when a threshold number of errors associated with the receipt or decoding of the ADU are identified.

In some examples, the interruption component 740 may be configured as or otherwise support a means for determining a threshold number of errors associated with the receipt or decoding of the ADU. In some examples, the interruption component 740 may be configured as or otherwise support a means for transmitting, before receipt of the ADU is complete, an interruption feedback message as the ADU level feedback based on the threshold number of errors being satisfied for the ADU.

In some examples, to support receiving the plurality of TBs representing the ADU, the feedback configuration component 730 may receive the ADU via a stream of coded packets encoded using outer coding, the outer coding introducing redundancy in the stream of coded packets.

In some examples, the UE may provide feedback at the ADU level based on the redundancy in the outer coding.

In some examples, to support receiving the indication, the feedback configuration component 730 may be configured as or otherwise support a means for receiving RRC signaling configuring the UE to provide the ADU level feedback.

In some examples, the feedback configuration component 730 may be configured as or otherwise support a means for receiving a control message that indicates whether the UE is to provide HARQ feedback, where the indication that the UE is to provide feedback at the ADU level was received in accordance with the control message.

In some examples, the control message indicates whether the UE is to provide HARQ feedback via a specific value of either a PDSCH-to-HARQ feedback timing indicator or a HARQ process number. In some examples, the control message includes downlink control information in a downlink control channel message.

In some examples, the indication is received via a downlink control channel configured to indicate that the UE is to provide one of transport block level feedback or the ADU level feedback.

Figure 8:
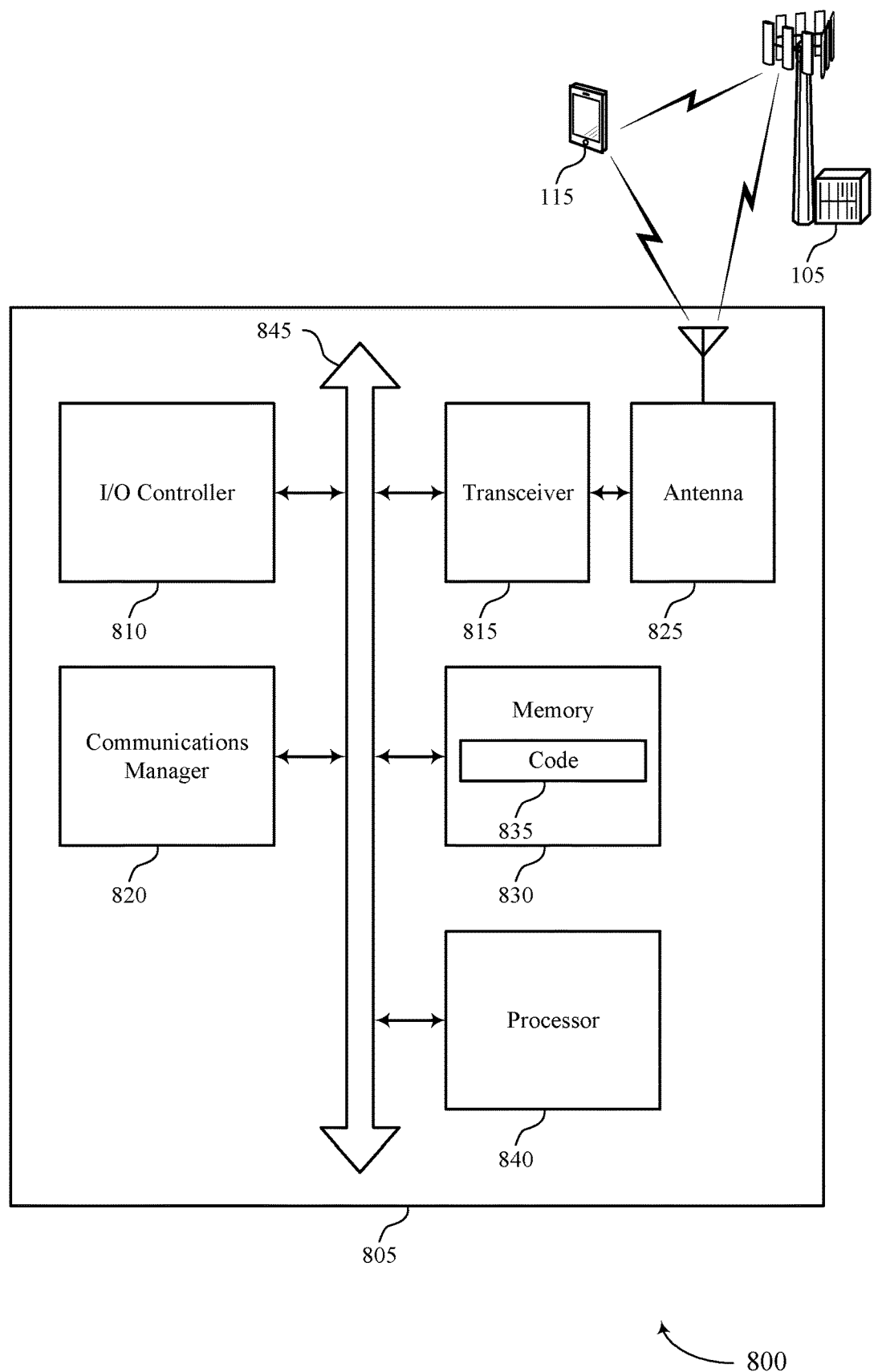
FIG. 8 shows a diagram of a system including a device that supports flexible feedback with outer coding in accordance with aspects of the present disclosure.

FIG. 8 shows a diagram of a system 800 including a device 805 that supports flexible feedback with outer coding in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting flexible feedback with outer coding). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, a set of multiple transport blocks representing an ADU. The communications manager 820 may be configured as or otherwise support a means for receiving an indication that the UE is to provide feedback at an ADU level. The communications manager 820 may be configured as or otherwise support a means for determining ADU level feedback for the set of multiple transport blocks. The communications manager 820 may be configured as or otherwise support a means for indicating the ADU level feedback to the base station.

By including or configuring the communications manager 820 in accordance with examples as described herein, the device 805 may support techniques for a base station 105 to configure a UE 115 to transmit ADU level feedback for a transmission, which may provide for improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of flexible feedback with outer coding as described herein, or the processor 840 and the memory 830 may be otherwise configured to perform or support such operations.

Figure 9:
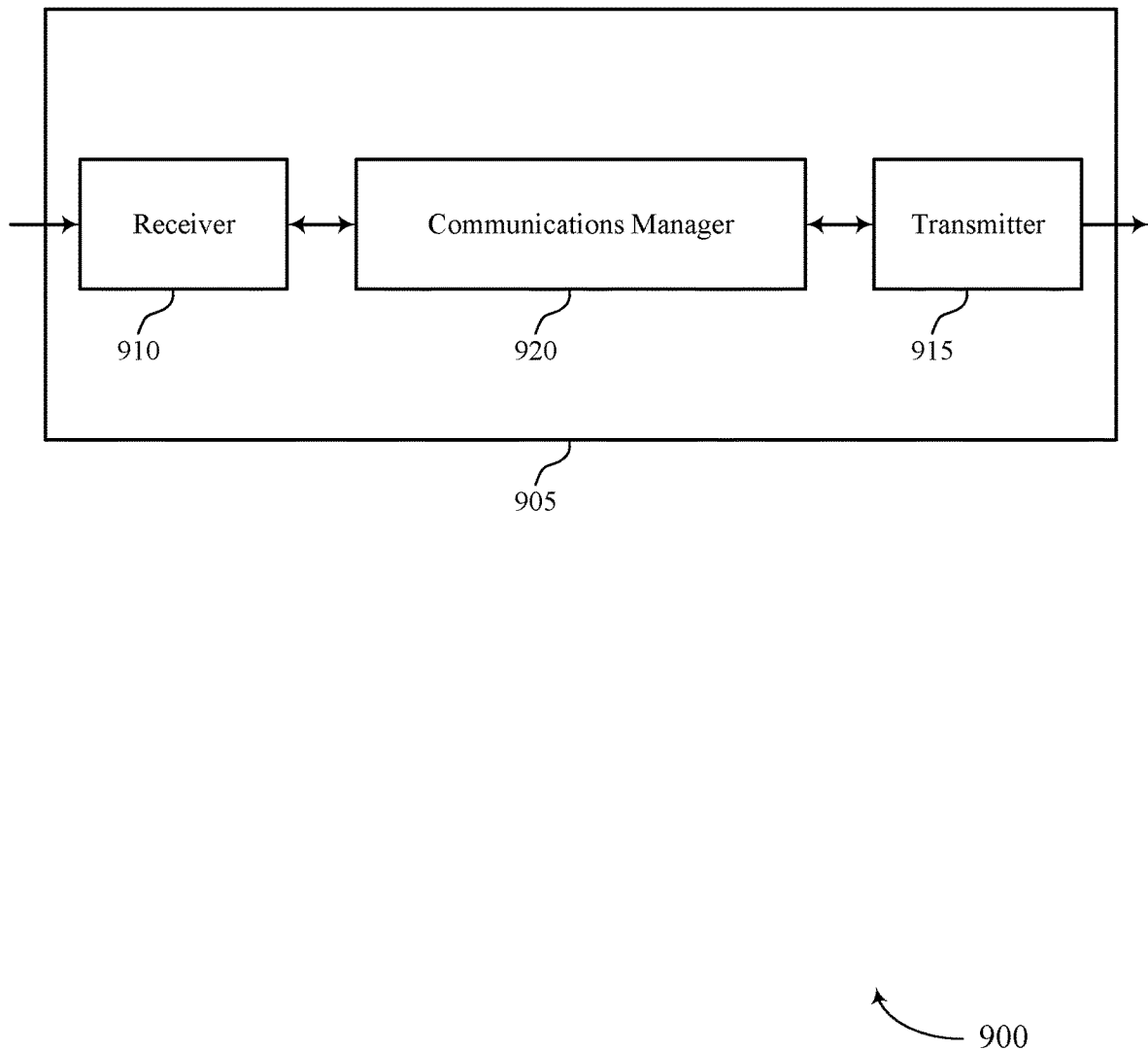
FIGS. 9 and 10 show block diagrams of devices that support flexible feedback with outer coding in accordance with aspects of the present disclosure.

FIG. 9 shows a block diagram 900 of a device 905 that supports flexible feedback with outer coding in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to flexible feedback with outer coding). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to flexible feedback with outer coding). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of flexible feedback with outer coding as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, a set of multiple transport blocks representing an ADU. The communications manager 920 may be configured as or otherwise support a means for transmitting an indication to the UE that the UE is to provide feedback at an ADU level. The communications manager 920 may be configured as or otherwise support a means for determining, based on a transmission from the UE or a lack of transmissions from the UE, ADU level feedback for the ADU. The communications manager 920 may be configured as or otherwise support a means for communicating with the UE in accordance with the ADU level feedback.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for a base station 105 to configure a UE 115 to transmit ADU level feedback for a transmission, which may provide for reduced processing, reduced power consumption, more efficient utilization of communication resources, or the like.

Figure 10:
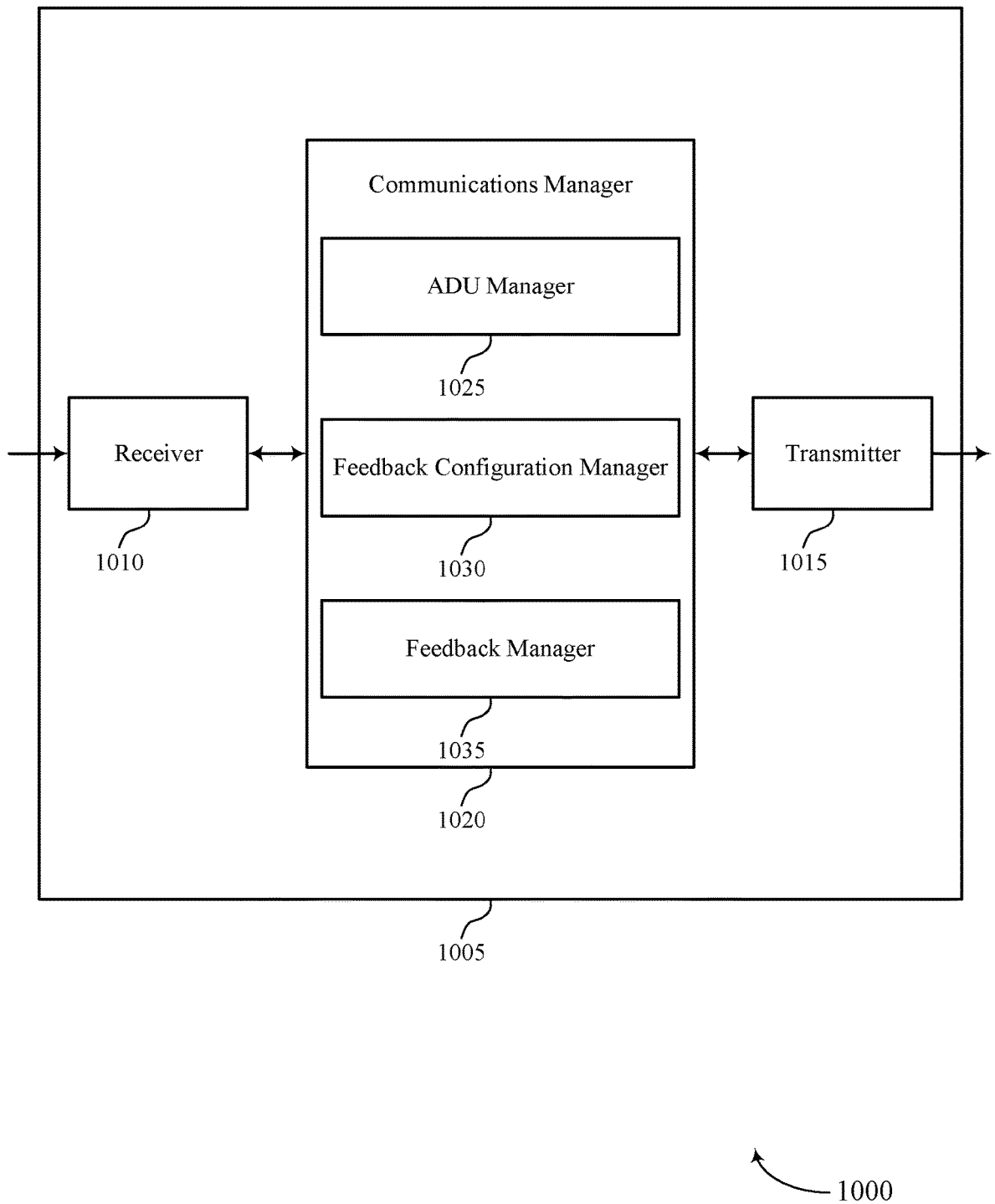

FIG. 10 shows a block diagram 1000 of a device 1005 that supports flexible feedback with outer coding in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to flexible feedback with outer coding). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to flexible feedback with outer coding). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of flexible feedback with outer coding as described herein. For example, the communications manager 1020 may include an ADU manager 1025, a feedback configuration manager 1030, a feedback manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The ADU manager 1025 may be configured as or otherwise support a means for transmitting, to a UE, a set of multiple transport blocks representing an ADU. The feedback configuration manager 1030 may be configured as or otherwise support a means for transmitting an indication to the UE that the UE is to provide feedback at an ADU level. The feedback manager 1035 may be configured as or otherwise support a means for determining, based on a transmission from the UE or a lack of transmissions from the UE, ADU level feedback for the ADU. The feedback manager 1035 may be configured as or otherwise support a means for communicating with the UE in accordance with the ADU level feedback.

Figure 11:
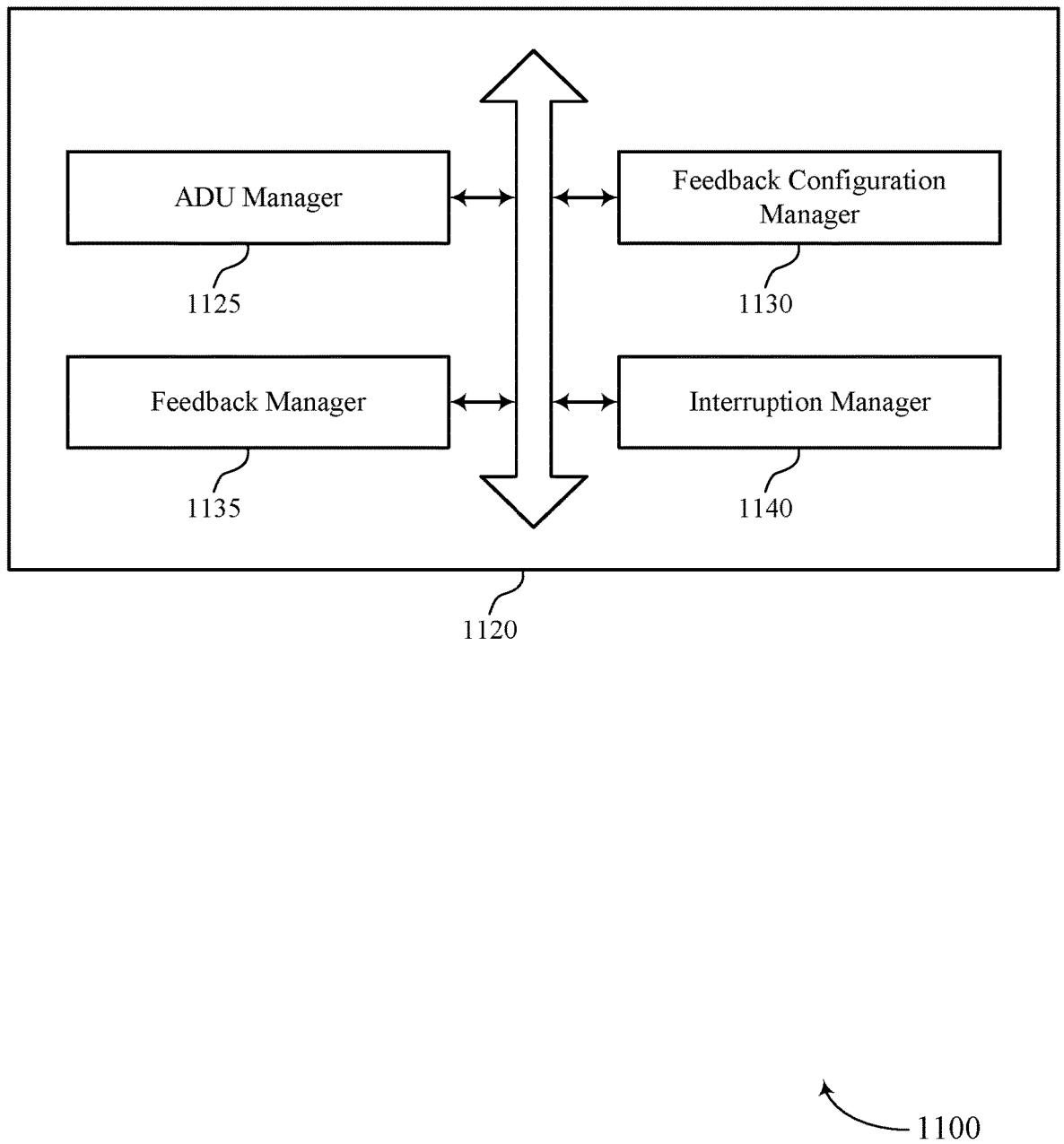
FIG. 11 shows a block diagram of a communications manager that supports flexible feedback with outer coding in accordance with aspects of the present disclosure.

FIG. 11 shows a block diagram 1100 of a communications manager 1120 that supports flexible feedback with outer coding in accordance with aspects of the present disclosure. The communications manager 1120 may be an example of aspects of a communications manager 920, a communications manager 1020, or both, as described herein. The communications manager 1120, or various components thereof, may be an example of means for performing various aspects of flexible feedback with outer coding as described herein. For example, the communications manager 1120 may include an ADU manager 1125, a feedback configuration manager 1130, a feedback manager 1135, an interruption manager 1140, or any combination thereof. Each of these components may communicate, directly or indirectly, with one another (e.g., via one or more buses).

The communications manager 1120 may support wireless communications at a base station in accordance with examples as disclosed herein. The ADU manager 1125 may be configured as or otherwise support a means for transmitting, to a UE, a set of multiple transport blocks representing an ADU. The feedback configuration manager 1130 may be configured as or otherwise support a means for transmitting an indication to the UE that the UE is to provide feedback at an ADU level. The feedback manager 1135 may be configured as or otherwise support a means for determining, based on a transmission from the UE or a lack of transmissions from the UE, ADU level feedback for the ADU. In some examples, the feedback manager 1135 may be configured as or otherwise support a means for communicating with the UE in accordance with the ADU level feedback.

In some examples, to support transmitting the indication, the feedback configuration manager 1130 may be configured as or otherwise support a means for transmitting an ADU level feedback configuration that provides that the UE is to transmit a positive feedback message when the ADU is decoded successfully and to refrain from transmitting a feedback message when the ADU is decoded or received unsuccessfully.

In some examples, to support determining the ADU level feedback, the feedback manager 1135 may be configured as or otherwise support a means for receiving, as the ADU level feedback, a positive feedback message from the UE indicating the ADU is decoded successfully.

In some examples, the feedback manager 1135 may be configured as or otherwise support a means for refraining from transmitting one or more additional transport blocks associated with the ADU based on receiving the positive feedback message.

In some examples, to support transmitting the indication, the feedback configuration manager 1130 may be configured as or otherwise support a means for transmitting an ADU level feedback configuration that provides that the UE is to transmit an interruption feedback message before receipt of the ADU is complete, the interruption feedback message configured to be transmitted when a threshold number of errors associated with the receipt or decoding of the ADU are identified.

In some examples, the interruption manager 1140 may be configured as or otherwise support a means for receiving, before transmission of the ADU is complete, an interruption feedback message as the ADU level feedback based on a threshold number of errors being satisfied for the ADU.

In some examples, to support receiving the plurality of TBs representing the ADU, the feedback configuration manager 1130 may receive the ADU via a stream of coded packets encoded using outer coding, the outer coding introducing redundancy in the stream of coded packets.

In some examples, the UE may provide feedback at the ADU level based on the redundancy in the outer coding.

In some examples, to support transmitting the indication, the feedback configuration manager 1130 may be configured as or otherwise support a means for transmitting RRC signaling configuring the UE to provide the ADU level feedback.

In some examples, the feedback configuration manager 1130 may be configured as or otherwise support a means for transmitting a control message that indicates whether the UE is to provide HARQ feedback, where the indication that the UE is to provide feedback at the ADU level was transmitted in accordance with the control message.

In some examples, the control message indicates whether the UE is to provide HARQ feedback via a specific value of either a PDSCH-to-HARQ feedback timing indicator or a HARQ process number. In some examples, the control message includes downlink control information in a downlink control channel message.

In some examples, the feedback configuration manager 1130 may be configured as or otherwise support a means for determining that the UE is to provide feedback based on a content of the set of multiple transport blocks representing the ADU. In some examples, the feedback configuration manager 1130 may be configured as or otherwise support a means for transmitting the indication based on the set of multiple transport blocks including a RRC message, a NAS message, one or more data radio bearers, or a combination thereof.

In some examples, the indication is transmitted via a downlink control channel configured to indicate that the UE is to provide one of transport block level feedback or the ADU level feedback.

Figure 12:
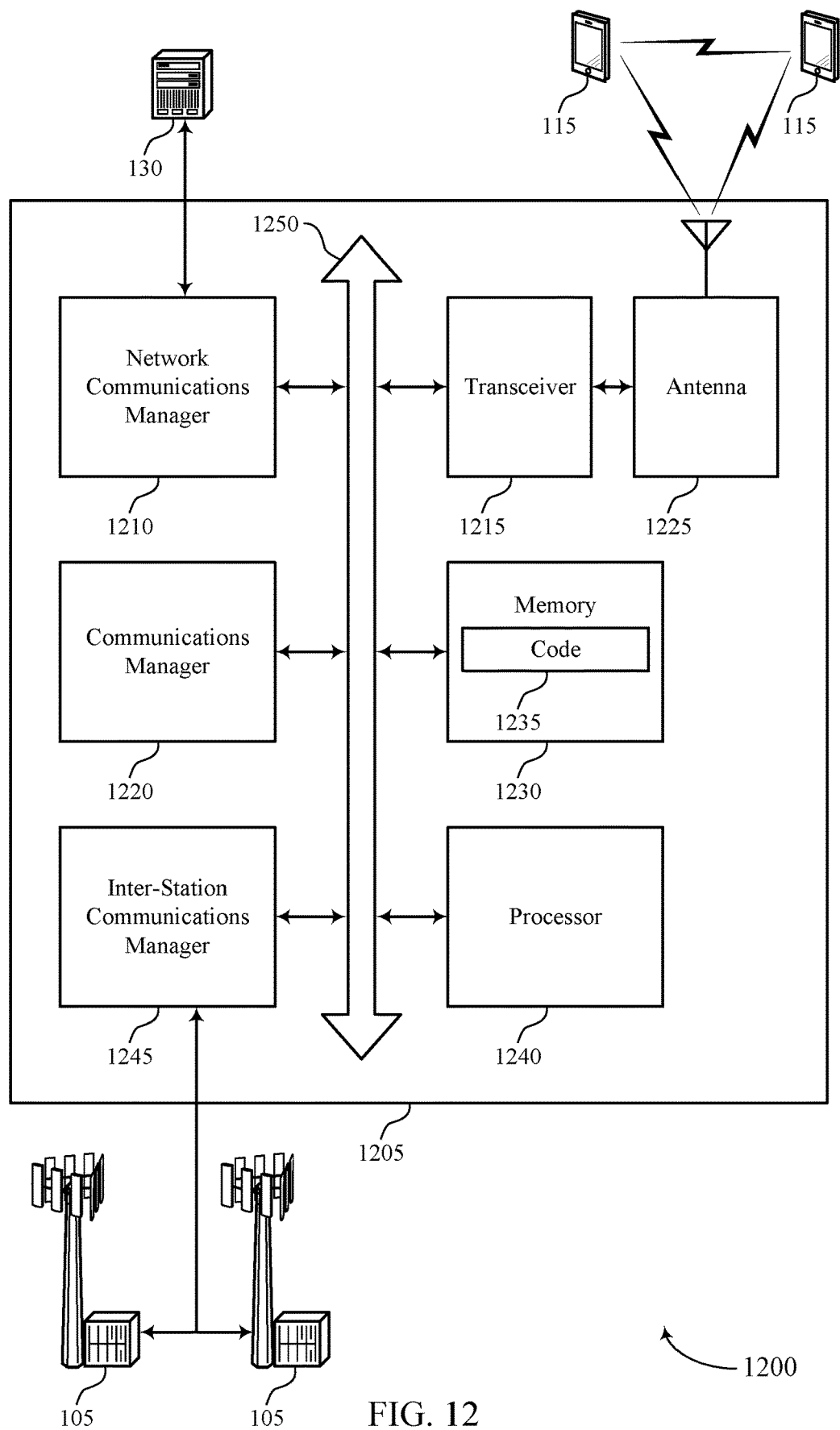
FIG. 12 shows a diagram of a system including a device that supports flexible feedback with outer coding in accordance with aspects of the present disclosure.

FIG. 12 shows a diagram of a system 1200 including a device 1205 that supports flexible feedback with outer coding in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting flexible feedback with outer coding). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, a set of multiple transport blocks representing an ADU. The communications manager 1220 may be configured as or otherwise support a means for transmitting an indication to the UE that the UE is to provide feedback at an ADU level. The communications manager 1220 may be configured as or otherwise support a means for determining, based on a transmission from the UE or a lack of transmissions from the UE, ADU level feedback for the ADU. The communications manager 1220 may be configured as or otherwise support a means for communicating with the UE in accordance with the ADU level feedback.

By including or configuring the communications manager 1220 in accordance with examples as described herein, the device 1205 may support techniques for a base station 105 to configure a UE 115 to transmit ADU level feedback for a transmission, which may provide for improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of flexible feedback with outer coding as described herein, or the processor 1240 and the memory 1230 may be otherwise configured to perform or support such operations.

Figure 13:
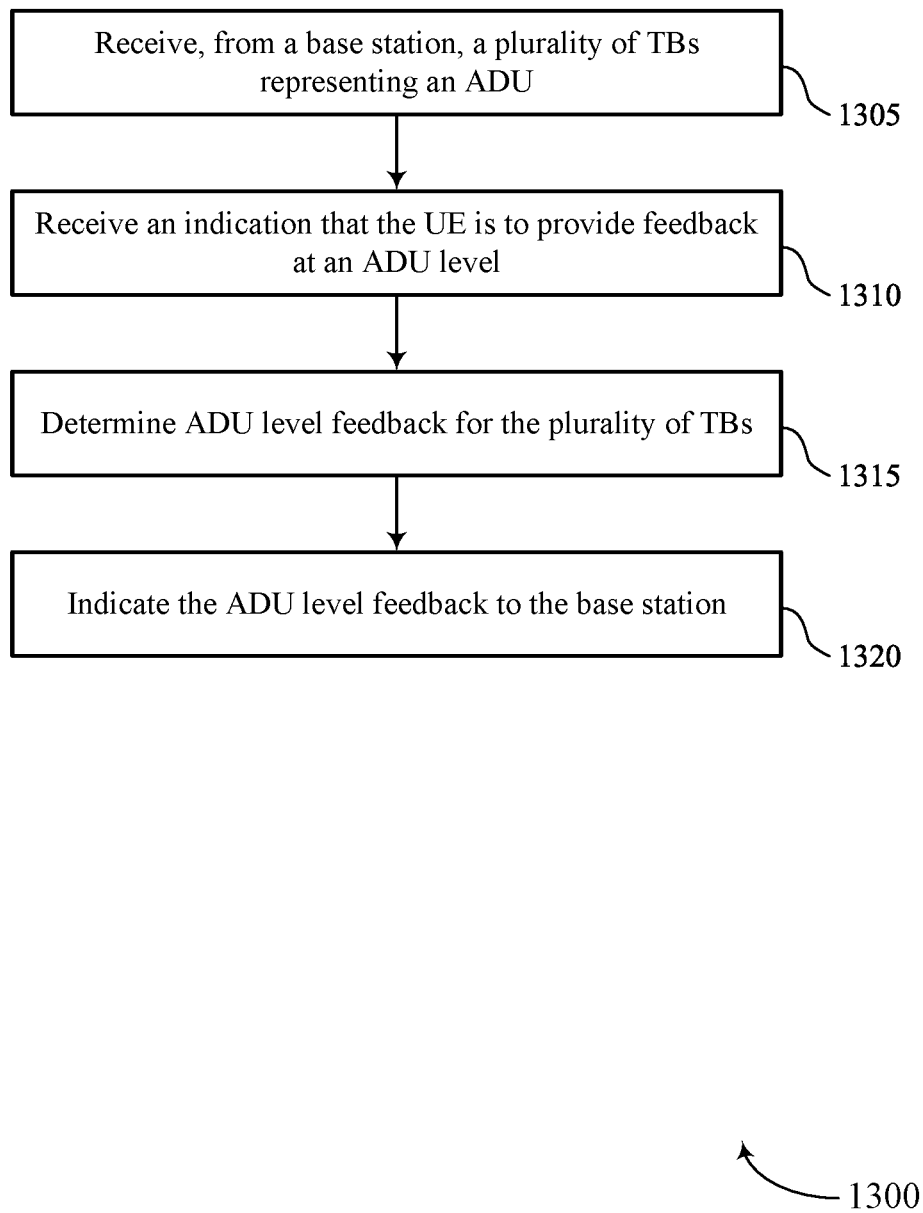
FIGS. 13 through 16 show flowcharts illustrating methods that support flexible feedback with outer coding in accordance with aspects of the present disclosure.

FIG. 13 shows a flowchart illustrating a method 1300 that supports flexible feedback with outer coding in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a set of multiple transport blocks representing an ADU. The operations of 1305 may be performed in accordance with examples as disclosed herein. In some examples, aspects of the operations of 1305 may be performed by an ADU component 725 as described with reference to FIG. 7.

At 1310, the method may include receiving an indication that the UE is to provide feedback at an ADU level. The operations of 1310 may be performed in accordance with examples as disclosed herein. In some examples, aspects of the operations of 1310 may be performed by a feedback configuration component 730 as described with reference to FIG. 7.

At 1315, the method may include determining ADU level feedback for the set of multiple transport blocks. The operations of 1315 may be performed in accordance with examples as disclosed herein. In some examples, aspects of the operations of 1315 may be performed by a feedback component 735 as described with reference to FIG. 7.

At 1320, the method may include indicating the ADU level feedback to the base station. The operations of 1320 may be performed in accordance with examples as disclosed herein. In some examples, aspects of the operations of 1320 may be performed by a feedback component 735 as described with reference to FIG. 7.

Figure 14:
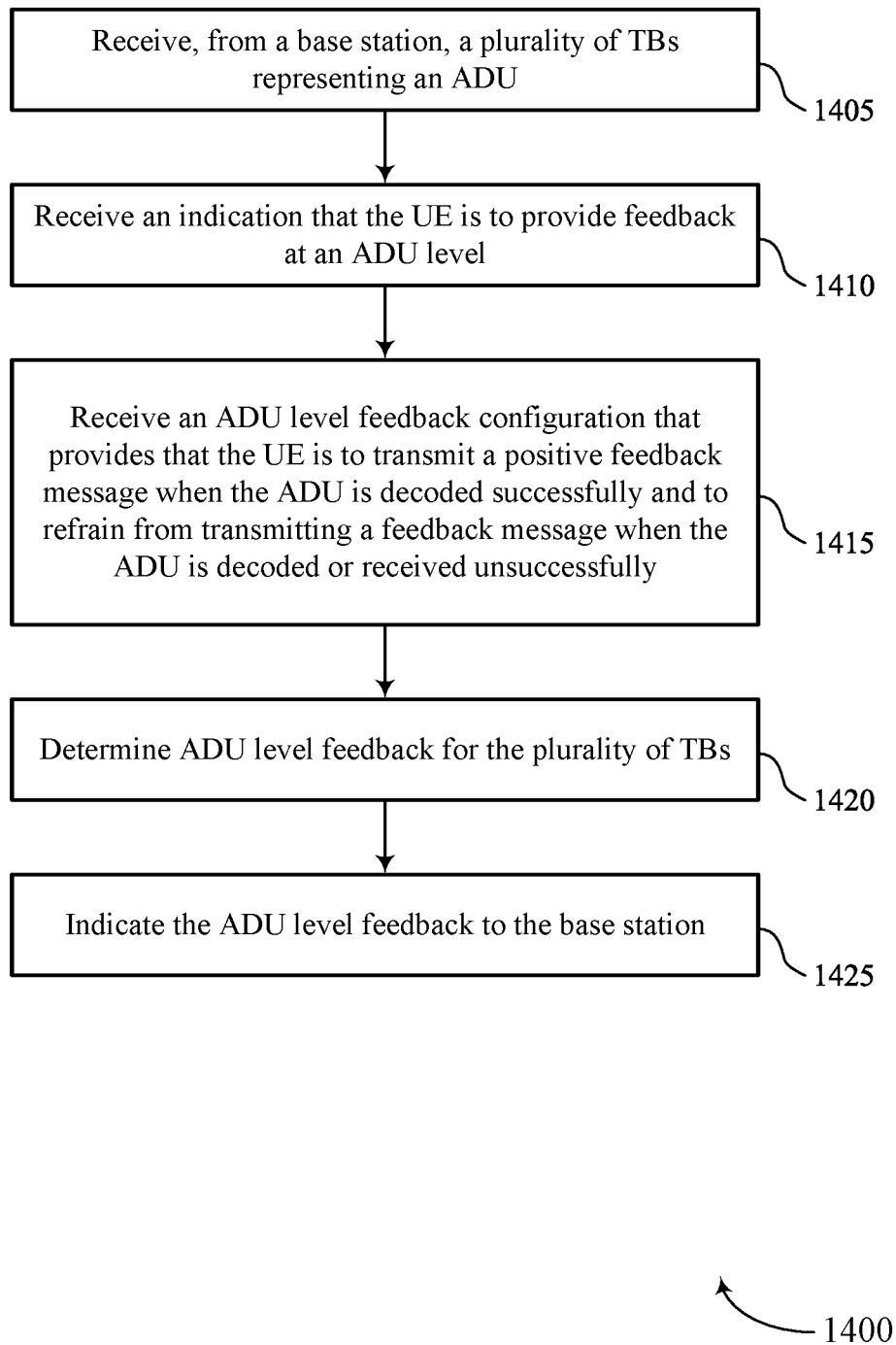

FIG. 14 shows a flowchart illustrating a method 1400 that supports flexible feedback with outer coding in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a set of multiple transport blocks representing an ADU. The operations of 1405 may be performed in accordance with examples as disclosed herein. In some examples, aspects of the operations of 1405 may be performed by an ADU component 725 as described with reference to FIG. 7.

At 1410, the method may include receiving an indication that the UE is to provide feedback at an ADU level. The operations of 1410 may be performed in accordance with examples as disclosed herein. In some examples, aspects of the operations of 1410 may be performed by a feedback configuration component 730 as described with reference to FIG. 7.

At 1415, the method may include receiving an ADU level feedback configuration that provides that the UE is to transmit a positive feedback message when the ADU is decoded successfully and to refrain from transmitting a feedback message when the ADU is decoded or received unsuccessfully. The operations of 1415 may be performed in accordance with examples as disclosed herein. In some examples, aspects of the operations of 1415 may be performed by a feedback configuration component 730 as described with reference to FIG. 7.

At 1420, the method may include determining ADU level feedback for the set of multiple transport blocks. The operations of 1420 may be performed in accordance with examples as disclosed herein. In some examples, aspects of the operations of 1420 may be performed by a feedback component 735 as described with reference to FIG. 7.

At 1425, the method may include indicating the ADU level feedback to the base station. The operations of 1425 may be performed in accordance with examples as disclosed herein. In some examples, aspects of the operations of 1425 may be performed by a feedback component 735 as described with reference to FIG. 7.

Figure 15:
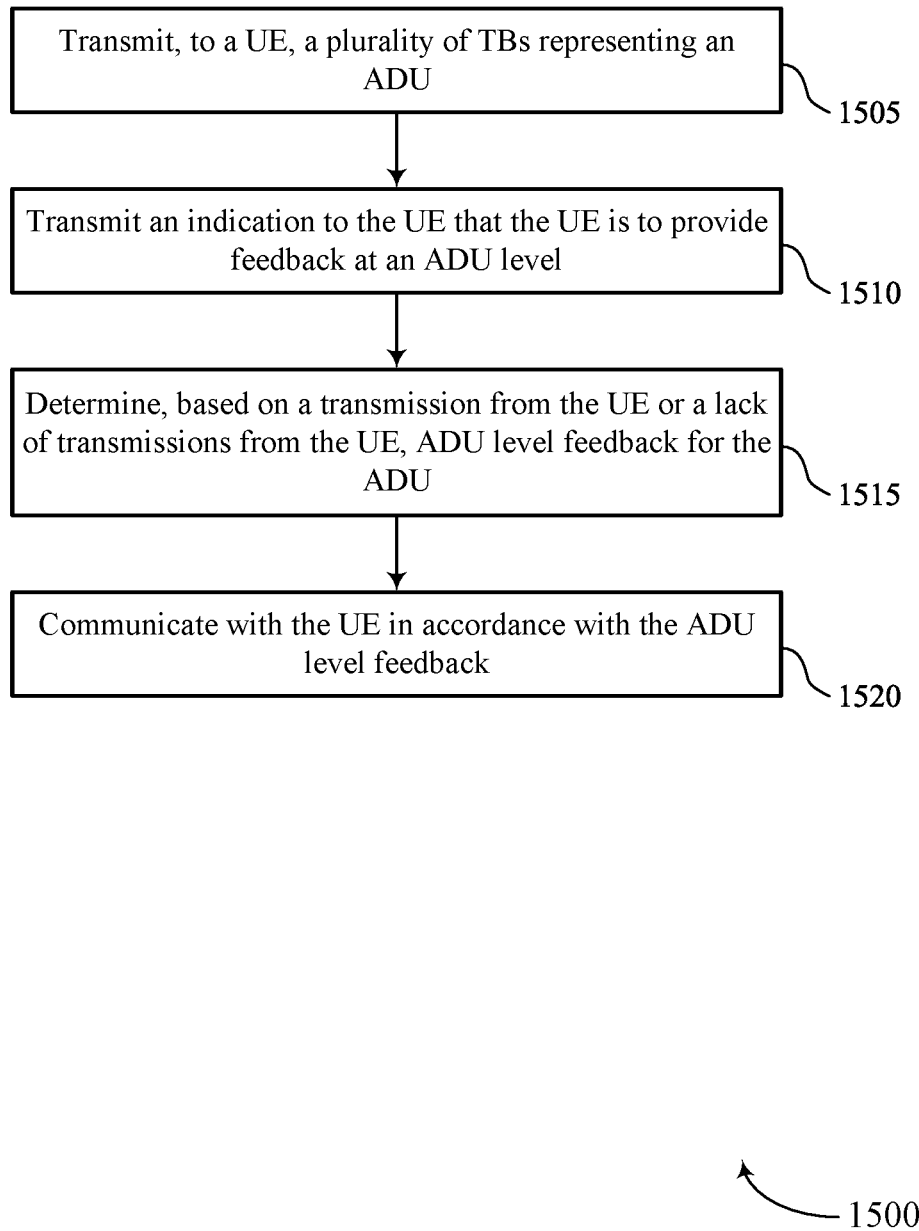

FIG. 15 shows a flowchart illustrating a method 1500 that supports flexible feedback with outer coding in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, a set of multiple transport blocks representing an ADU. The operations of 1505 may be performed in accordance with examples as disclosed herein. In some examples, aspects of the operations of 1505 may be performed by an ADU manager 1125 as described with reference to FIG. 11.

At 1510, the method may include transmitting an indication to the UE that the UE is to provide feedback at an ADU level. The operations of 1510 may be performed in accordance with examples as disclosed herein. In some examples, aspects of the operations of 1510 may be performed by a feedback configuration manager 1130 as described with reference to FIG. 11.

At 1515, the method may include determining, based on a transmission from the UE or a lack of transmissions from the UE, ADU level feedback for the ADU. The operations of 1515 may be performed in accordance with examples as disclosed herein. In some examples, aspects of the operations of 1515 may be performed by a feedback manager 1135 as described with reference to FIG. 11.

At 1520, the method may include communicating with the UE in accordance with the ADU level feedback. The operations of 1520 may be performed in accordance with examples as disclosed herein. In some examples, aspects of the operations of 1520 may be performed by a feedback manager 1135 as described with reference to FIG. 11.

Figure 16:
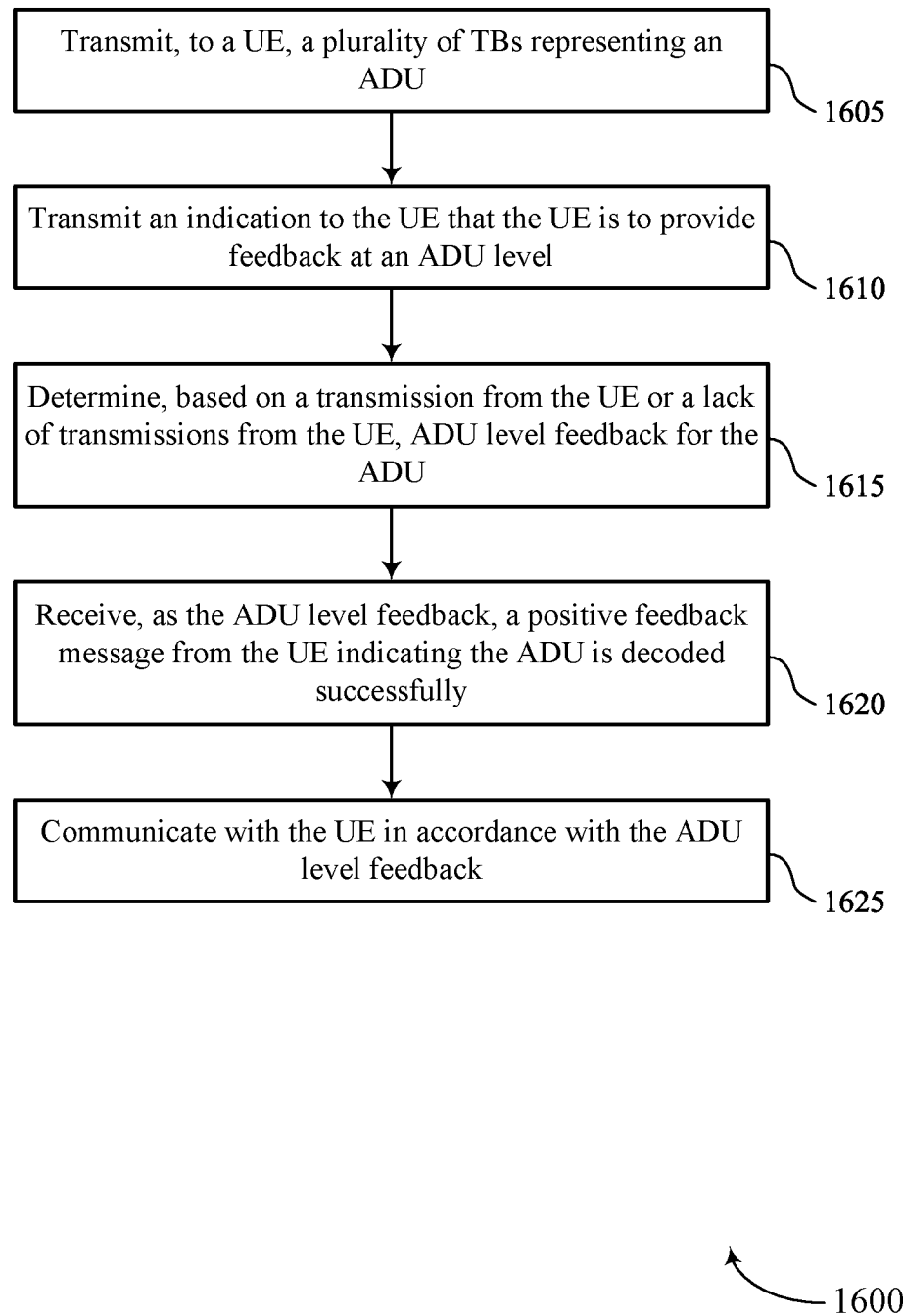

FIG. 16 shows a flowchart illustrating a method 1600 that supports flexible feedback with outer coding in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a set of multiple transport blocks representing an ADU. The operations of 1605 may be performed in accordance with examples as disclosed herein. In some examples, aspects of the operations of 1605 may be performed by an ADU manager 1125 as described with reference to FIG. 11.

At 1610, the method may include transmitting an indication to the UE that the UE is to provide feedback at an ADU level. The operations of 1610 may be performed in accordance with examples as disclosed herein. In some examples, aspects of the operations of 1610 may be performed by a feedback configuration manager 1130 as described with reference to FIG. 11.

At 1615, the method may include determining, based on a transmission from the UE or a lack of transmissions from the UE, ADU level feedback for the ADU. The operations of 1615 may be performed in accordance with examples as disclosed herein. In some examples, aspects of the operations of 1615 may be performed by a feedback manager 1135 as described with reference to FIG. 11.

At 1620, the method may include receiving, as the ADU level feedback, a positive feedback message from the UE indicating the ADU is decoded successfully. The operations of 1620 may be performed in accordance with examples as disclosed herein. In some examples, aspects of the operations of 1620 may be performed by a feedback manager 1135 as described with reference to FIG. 11.

At 1625, the method may include communicating with the UE in accordance with the ADU level feedback. The operations of 1625 may be performed in accordance with examples as disclosed herein. In some examples, aspects of the operations of 1625 may be performed by a feedback manager 1135 as described with reference to FIG. 11.

The following provides an overview of aspects of the present disclosure:

Aspect 1: A method for wireless communications at a UE, comprising: receiving, from a base station, a plurality of transport blocks representing an application data unit; receiving an indication that the UE is to provide feedback at an application data unit level; determining application data unit level feedback for the plurality of transport blocks; and indicating the application data unit level feedback to the base station.

Aspect 2: The method of aspect 1, wherein receiving the indication further comprises: receiving an application data unit level feedback configuration that provides that the UE is to transmit a positive feedback message when the application data unit is decoded successfully and to refrain from transmitting a feedback message when the application data unit is decoded or received unsuccessfully.

Aspect 3: The method of any of aspects 1 through 2, wherein indicating the application data unit level feedback to the base station further comprises: transmitting, as the application data unit level feedback, a positive feedback message indicating the application data unit is decoded successfully.

Aspect 4: The method of any of aspects 1 through 2, wherein indicating the application data unit level feedback to the base station further comprises: refraining from transmitting a feedback message for the application data unit based at least in part on the application data unit being decoded or received unsuccessfully, wherein an absence of feedback message transmission is indicative of a negative feedback message.

Aspect 5: The method of any of aspects 1 through 4, wherein receiving the indication further comprises: receiving an application data unit level feedback configuration that provides that the UE is to transmit an interruption feedback message before receipt of the application data unit is complete, the interruption feedback message configured to be transmitted when a threshold number of errors associated with the receipt or decoding of the application data unit are identified.

Aspect 6: The method of any of aspects 1 through 5, further comprising: determining a threshold number of errors associated with the receipt or decoding of the application data unit; and transmitting, before receipt of the application data unit is complete, an interruption feedback message as the application data unit level feedback based at least in part on the threshold number of errors being satisfied for the application data unit.

Aspect 7: The method of any of aspects 1 through 6, wherein receiving the plurality of transport blocks representing the application data unit further comprises: receiving the application data unit via a stream of coded packets encoded using outer coding, the outer coding introducing redundancy in the stream of coded packets.

Aspect 8: The method of aspect 7, wherein the UE is to provide feedback at the application data unit level based at least in part on the redundancy in the outer coding.

Aspect 9: The method of any of aspects 1 through 8, wherein receiving the indication further comprises: receiving radio resource control signaling configuring the UE to provide the application data unit level feedback.

Aspect 10: The method of any of aspects 1 through 9, further comprising: receiving a control message that indicates whether the UE is to provide HARQ feedback, wherein the indication that the UE is to provide feedback at the application data unit level was received in accordance with the control message.

Aspect 11: The method of aspect 10, wherein the control message indicates whether the UE is to provide HARQ feedback via a specific value of either an PDSCH-to-HARQ feedback timing indicator or a HARQ process number, the control message includes downlink control information in a downlink control channel message.

Aspect 12: The method of any of aspects 1 through 11 wherein the indication is received via a downlink control channel configured to indicate that the UE is to provide one of transport block level feedback or the application data unit level feedback.

Aspect 13: A method for wireless communications at a base station, comprising: transmitting, to a UE, a plurality of transport blocks representing an application data unit; transmitting an indication to the UE that the UE is to provide feedback at an application data unit level; determining, based on a transmission from the UE or a lack of transmissions from the UE, application data unit level feedback for the application data unit; and communicating with the UE in accordance with the application data unit level feedback.

Aspect 14: The method of aspect 13, wherein transmitting the indication further comprises: transmitting an application data unit level feedback configuration that provides that the UE is to transmit a positive feedback message when the application data unit is decoded successfully and to refrain from transmitting a feedback message when the application data unit is decoded or received unsuccessfully.

Aspect 15: The method of any of aspects 13 through 14, wherein determining the application data unit level feedback further comprises: receiving, as the application data unit level feedback, a positive feedback message from the UE indicating the application data unit is decoded successfully.

Aspect 16: The method of any of aspects 13 through 14 further comprising: refraining from transmitting one or more additional transport blocks associated with the application data unit based at least in part on receiving the positive feedback message.

Aspect 17: The method of any of aspects 13 through 16, wherein transmitting the indication further comprises: transmitting an application data unit level feedback configuration that provides that the UE is to transmit an interruption feedback message before receipt of the application data unit is complete, the interruption feedback message configured to be transmitted when a threshold number of errors associated with the receipt or decoding of the application data unit are identified.

Aspect 18: The method of any of aspects 13 through 17, further comprising: receiving, before transmission of the application data unit is complete, an interruption feedback message as the application data unit level feedback based at least in part on a threshold number of errors being satisfied for the application data unit.

Aspect 19: The method of any of aspects 13 through 18, wherein transmitting the plurality of transport blocks representing the application data unit further comprises: transmitting the application data unit via a stream of coded packets encoded using outer coding, the outer coding introducing redundancy in the stream of coded packets Aspect 20: The method of aspect 19, wherein the UE is to provide feedback at the application data unit level based at least in part on the redundancy in the outer coding.

Aspect 21: The method of any of aspects 13 through 20, wherein transmitting the indication further comprises: transmitting radio resource control signaling configuring the UE to provide the application data unit level feedback.

Aspect 22: The method of any of aspects 13 through 21, further comprising: transmitting a control message that indicates whether the UE is to provide HARQ feedback, wherein the indication that the UE is to provide feedback at the application data unit level was transmitted in accordance with the control message.

Aspect 23: The method of aspect 22, wherein the control message indicates whether the UE is to provide HARQ feedback via a specific value of either an PDSCH-to-HARQ feedback timing indicator or a HARQ process number, the control message includes downlink control information in a downlink control channel message.

Aspect 24: The method of any of aspects 13 through 23, further comprising: determining that the UE is to provide feedback based at least in part on a content of the plurality of transport blocks representing the application data unit; and transmitting the indication based at least in part on the plurality of transport blocks including a radio resource control message, a non-access stratum message, one or more data radio bearers, or a combination thereof.

Aspect 25: The method of any of aspects 13 through 24, wherein the indication is transmitted via a downlink control channel configured to indicate that the UE is to provide one of transport block level feedback or the application data unit level feedback.

Aspect 26: An apparatus for wireless communications at a UE, comprising a processor; memory coupled with the processor; and instructions stored in the memory and executable by the processor to cause the apparatus to perform a method of any of aspects 1 through 12.

Aspect 27: An apparatus for wireless communications at a UE, comprising at least one means for performing a method of any of aspects 1 through 12.

Aspect 28: A non-transitory computer-readable medium storing code for wireless communications at a UE, the code comprising instructions executable by a processor to perform a method of any of aspects 1 through 12.

Aspect 29: An apparatus for wireless communications at a base station, comprising a processor; memory coupled with the processor; and instructions stored in the memory and executable by the processor to cause the apparatus to perform a method of any of aspects 13 through 25.

Aspect 30: An apparatus for wireless communications at a base station, comprising at least one means for performing a method of any of aspects 13 through 25.

Aspect 31: A non-transitory computer-readable medium storing code for wireless communications at a base station, the code comprising instructions executable by a processor to perform a method of any of aspects 13 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network node, a plurality of transport blocks representing an application data unit;
   receiving an indication that the UE is to provide feedback at an application data unit level;
   determining application data unit level feedback for the plurality of transport blocks based at least in part on a quantity of the plurality of transport blocks that were successfully decoded by the UE; and
   indicating the application data unit level feedback to the network node.

2. The method of claim 1, wherein receiving the indication further comprises:
   receiving an application data unit level feedback configuration that provides that the UE is to transmit a positive feedback message when the application data unit is decoded successfully and to refrain from transmitting a feedback message when the application data unit is decoded or received unsuccessfully.

3. The method of claim 1, wherein indicating the application data unit level feedback to the network node further comprises:
   transmitting, as the application data unit level feedback, a positive feedback message indicating the application data unit is decoded successfully.

4. The method of claim 1, wherein indicating the application data unit level feedback to the network node further comprises:
   refraining from transmitting a feedback message for the application data unit based at least in part on the application data unit being decoded or received unsuccessfully, wherein an absence of feedback message transmission is indicative of a negative feedback message.

5. The method of claim 1, wherein receiving the indication further comprises:
   receiving an application data unit level feedback configuration that provides that the UE is to transmit an interruption feedback message before receipt of the application data unit is complete, the interruption feedback message configured to be transmitted when a threshold quantity of errors associated with the receipt or decoding of the application data unit are identified.

6. The method of claim 1, further comprising:
   determining a threshold quantity of errors associated with the receipt or decoding of the application data unit; and
   transmitting, before receipt of the application data unit is complete, an interruption feedback message as the application data unit level feedback based at least in part on the threshold quantity of errors being satisfied for the application data unit.

7. The method of claim 1, wherein receiving the plurality of transport blocks representing the application data unit further comprises:
   receiving the application data unit via a stream of coded packets encoded using outer coding, the outer coding introducing redundancy in the stream of coded packets.

8. The method of claim 7, wherein the UE is to provide feedback at the application data unit level based at least in part on the redundancy in the outer coding.

9. The method of claim 1, wherein receiving the indication further comprises:
   receiving radio resource control signaling configuring the UE to provide the application data unit level feedback.

10. The method of claim 1, further comprising:
    receiving a control message that indicates whether the UE is to provide hybrid automatic repeat request (HARQ) feedback, wherein the indication that the UE is to provide feedback at the application data unit level was received in accordance with the control message.

11. The method of claim 10, wherein the control message indicates whether the UE is to provide HARQ feedback via a specific value of either a physical downlink shared channel (PDSCH)-to-HARQ feedback timing indicator or a HARQ process number, and wherein the control message includes downlink control information in a downlink control channel message.

12. The method of claim 1, wherein the indication is received via a downlink control channel configured to indicate that the UE is to provide one of transport block level feedback or the application data unit level feedback.

13. A method for wireless communications at a network node, comprising:
    transmitting, to a user equipment (UE), a plurality of transport blocks representing an application data unit;
    transmitting an indication to the UE that the UE is to provide feedback at an application data unit level;
    determining, based on a transmission from the UE or a lack of transmissions from the UE, application data unit level feedback for the application data unit, wherein the application data unit level feedback is based at least in part on a quantity of the plurality of transport blocks that were successfully decoded by the UE; and
    communicating with the UE in accordance with the application data unit level feedback.

14. The method of claim 13, wherein transmitting the indication further comprises:
    transmitting an application data unit level feedback configuration that provides that the UE is to transmit a positive feedback message when the application data unit is decoded successfully and to refrain from transmitting a feedback message when the application data unit is decoded or received unsuccessfully.

15. The method of claim 13, wherein determining the application data unit level feedback further comprises:

receiving, as the application data unit level feedback, a positive feedback message from the UE indicating the application data unit is decoded successfully.

16. The method of claim 15 further comprising:
refraining from transmitting one or more additional transport blocks associated with the application data unit based at least in part on receiving the positive feedback message.

17. The method of claim 13, wherein transmitting the indication further comprises:
transmitting an application data unit level feedback configuration that provides that the UE is to transmit an interruption feedback message before receipt of the application data unit is complete, the interruption feedback message configured to be transmitted when a threshold quantity of errors associated with the receipt or decoding of the application data unit are identified.

18. The method of claim 13, further comprising:
receiving, before transmission of the application data unit is complete, an interruption feedback message as the application data unit level feedback based at least in part on a threshold quantity of errors being satisfied for the application data unit.

19. The method of claim 13, wherein transmitting the plurality of transport blocks representing the application data unit further comprises:
transmitting the application data unit via a stream of coded packets encoded using outer coding, the outer coding introducing redundancy in the stream of coded packets.

20. The method of claim 19, wherein the UE is to provide feedback at the application data unit level based at least in part on the redundancy in the outer coding.

21. The method of claim 13, wherein transmitting the indication further comprises:
transmitting radio resource control signaling configuring the UE to provide the application data unit level feedback.

22. The method of claim 13, further comprising:
transmitting a control message that indicates whether the UE is to provide hybrid automatic repeat request (HARQ) feedback, wherein the indication that the UE is to provide feedback at the application data unit level was transmitted in accordance with the control message.

23. The method of claim 22, wherein the control message indicates whether the UE is to provide HARQ feedback via a specific value of either a physical downlink shared channel (PDSCH)-to-HARQ feedback timing indicator or a HARQ process number, and wherein the control message includes downlink control information in a downlink control channel message.

24. The method of claim 13, further comprising:
determining that the UE is to provide feedback based at least in part on a content of the plurality of transport blocks representing the application data unit; and
transmitting the indication based at least in part on the plurality of transport blocks including a radio resource control message, a non-access stratum message, one or more data radio bearers, or a combination thereof.

25. The method of claim 13, wherein the indication is transmitted via a downlink control channel configured to indicate that the UE is to provide one of transport block level feedback or the application data unit level feedback.

26. An apparatus for wireless communications by a user equipment (UE), comprising:
a processor;
memory coupled with the processor; and
instructions stored in the memory and executable by the processor to cause the apparatus to:
receive, from a network node, a plurality of transport blocks representing an application data unit;
receive an indication that the UE is to provide feedback at an application data unit level;
determine application data unit level feedback for the plurality of transport blocks based at least in part on a quantity of the plurality of transport blocks that were successfully decoded by the UE; and
indicate the application data unit level feedback to the network node.

27. The apparatus of claim 26, wherein the instructions to receive the indication are further executable by the processor to cause the apparatus to:
receive an application data unit level feedback configuration that provides that the UE is to transmit a positive feedback message when the application data unit is decoded successfully and to refrain from transmitting a feedback message when the application data unit is decoded or received unsuccessfully.

28. The apparatus of claim 26, wherein the instructions to indicate the application data unit level feedback to the network node are further executable by the processor to cause the apparatus to:
transmit, as the application data unit level feedback, a positive feedback message indicating the application data unit is decoded successfully.

29. The apparatus of claim 26, wherein the instructions to indicate the application data unit level feedback to the network node are further executable by the processor to cause the apparatus to:
refrain from transmitting a feedback message for the application data unit based at least in part on the application data unit being decoded or received unsuccessfully, wherein an absence of feedback message transmission is indicative of a negative feedback message.

30. An apparatus for wireless communications, comprising:
a processor;
memory coupled with the processor; and
instructions stored in the memory and executable by the processor to cause the apparatus to:
transmit, to a user equipment (UE), a plurality of transport blocks representing an application data unit;
transmit an indication to the UE that the UE is to provide feedback at an application data unit level;
determine, based on a transmission from the UE or a lack of transmissions from the UE, application data unit level feedback for the application data unit, wherein the application data unit level feedback is based at least in part on a quantity of the plurality of transport blocks that were successfully decoded by the UE; and
communicate with the UE in accordance with the application data unit level feedback.

* * * * *